US012659004B2

(12) United States Patent
Djordjevic et al.

(10) Patent No.: US 12,659,004 B2
(45) Date of Patent: Jun. 16, 2026

(54) TECHNIQUE FOR ROTATING MULTI-SECTOR ANTENNAS ON AIRCRAFTS

(71) Applicant: Telefonaktiebolaget LM Ericsson (publ), Stockholm (SE)

(72) Inventors: Branko Djordjevic, Herzogenrath (DE); Wojciech Potentas, Lodz (PL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 407 days.

(21) Appl. No.: 18/017,343

(22) PCT Filed: Jul. 23, 2020

(86) PCT No.: PCT/EP2020/070787
§ 371 (c)(1),
(2) Date: Jan. 20, 2023

(87) PCT Pub. No.: WO2022/017602
PCT Pub. Date: Jan. 27, 2022

(65) Prior Publication Data
US 2023/0353221 A1      Nov. 2, 2023

(51) Int. Cl.
*H04B 7/06*      (2006.01)
*H01Q 1/28*      (2006.01)
(Continued)

(52) U.S. Cl.
CPC ........... *H04B 7/06952* (2023.05); *H01Q 1/28* (2013.01); *H01Q 3/04* (2013.01); *H04B 7/0408* (2013.01); *H04B 17/318* (2015.01); *H04W 84/06* (2013.01)

(58) Field of Classification Search
CPC .......................... H04B 7/06952; H04B 7/0408; H04B 17/318; H04B 7/18502; H01Q 1/28; H01Q 3/04; H04W 84/06
See application file for complete search history.

(56) References Cited

U.S. PATENT DOCUMENTS 3,953,857 A * 4/1976 Jenks ....................... H01Q 3/34
                                                                    343/705
5,357,259 A * 10/1994 Nosal ..................... G01S 7/032
                                                                    343/705
(Continued)

FOREIGN PATENT DOCUMENTS

WO          2015139733 A1      9/2015
WO          2020113062 A1      6/2020

OTHER PUBLICATIONS

International Search Report and Written Opinion of the International Searching Authority for PCT International Application No. PCT/EP2020/070787 dated Jun. 23, 2021.

*Primary Examiner* — Kenneth T Lam
(74) *Attorney, Agent, or Firm* — Sage Patent Group

(57)      ABSTRACT

A technique for rotating one or more multi-sector antennas mounted on unmanned aircrafts of a radio access network, RAN, is described. Each of the multi-sector antennas comprises multiple sectors. The multiple sectors of each of the multi-sector antennas are configured to provide radio access to radio devices in different azimuthal directions that are changeable relative to the aircraft and fixed relative to each other when rotating the respective one of the multi-sector antennas. As to a method aspect of the technique, the at least one or each of the aircrafts of the RAN determines signal strengths of radio signals exchanged between a first radio device and at least two of the multiple sectors of the multi-sector antenna mounted on the respective one of the aircrafts. Based on the determined signal strengths, a first azimuthal direction is computed for providing radio access to the first radio device. A first sector of the multiple sectors of the multi-sector antenna mounted on the respective one of the aircrafts is rotated in the computed first azimuthal direction.

20 Claims, 25 Drawing Sheets

200

(51) Int. Cl.
    *H01Q 3/04*        (2006.01)
    *H04B 7/0408*    (2017.01)
    *H04B 17/318*    (2015.01)
    *H04W 84/06*    (2009.01)

(56) References Cited

U.S. PATENT DOCUMENTS

| | | | |
|---|---|---|---|
| 2004/0219877 A1 | 11/2004 | Myer et al. | |
| 2014/0218239 A1* | 8/2014 | Sharawi | G05D 1/0094 |
| | | | 342/422 |
| 2015/0116155 A1* | 4/2015 | Chibane | H01Q 3/08 |
| | | | 342/372 |
| 2017/0126309 A1 | 5/2017 | Rupasinghe et al. | |
| 2017/0127293 A1 | 5/2017 | Picker | |
| 2019/0006749 A1* | 1/2019 | Mack | H01Q 1/1257 |
| 2019/0058523 A1 | 2/2019 | Wu et al. | |
| 2019/0079176 A1* | 3/2019 | Weissman | G01S 5/0036 |
| 2019/0196005 A1* | 6/2019 | Calabrese | G01S 7/4026 |
| 2020/0295455 A1* | 9/2020 | Mack | H01Q 3/02 |
| 2020/0341135 A1* | 10/2020 | Jiang | H04W 64/006 |
| 2021/0311157 A1* | 10/2021 | Takahashi | G01C 15/00 |
| 2022/0069876 A1* | 3/2022 | Xue | H04B 7/18504 |
| 2023/0147179 A1* | 5/2023 | Sawa | G01S 3/42 |
| | | | 307/104 |

* cited by examiner

<u>100</u>

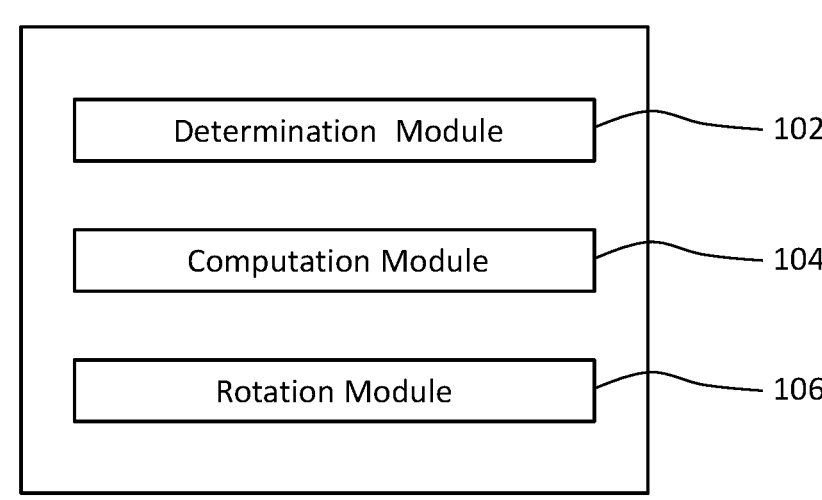

Determination Module — 102

Computation Module — 104

Rotation Module — 106

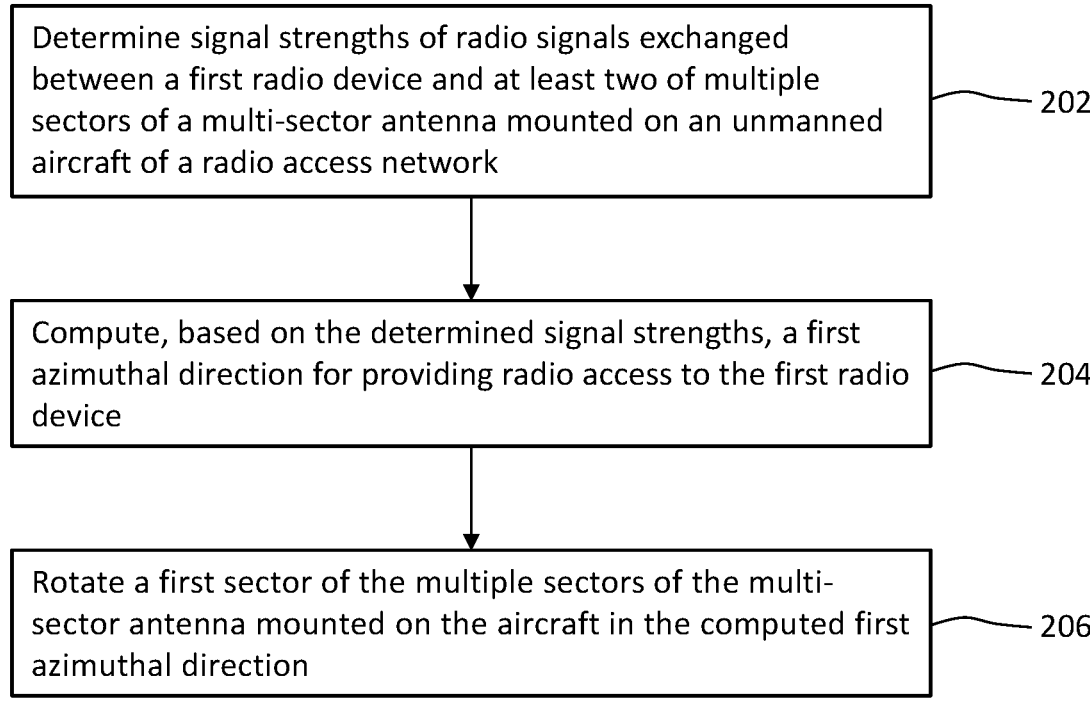

Determine signal strengths of radio signals exchanged between a first radio device and at least two of multiple sectors of a multi-sector antenna mounted on an unmanned aircraft of a radio access network — 202

Compute, based on the determined signal strengths, a first azimuthal direction for providing radio access to the first radio device — 204

Rotate a first sector of the multiple sectors of the multi-sector antenna mounted on the aircraft in the computed first azimuthal direction — 206

Antenna angle,
Flight cinematics        Weather
conditions        Signal
measurements

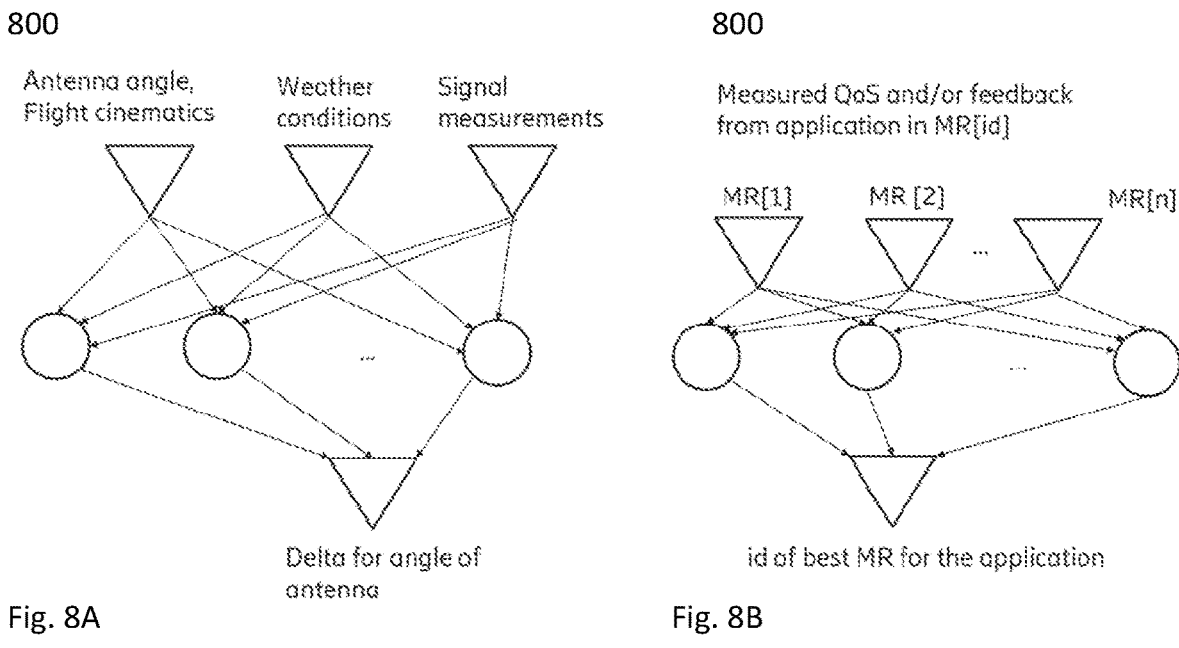

Delta for angle of
antenna

Measured QoS and/or feedback
from application in MR[id]

MR[1]        MR [2]        MR[n]

...

id of best MR for the application

Antenna angle
(T-1,T-2..T-n)),        Weather
conditions        Signal
Measurements
(T-1,T-2,...T-n)        Measured QoS
(T-1,T-2,...T-n)
Flight cinematics

...

Delta for angle of
Antenna (T)        Predicted score from
application (T)

Master MR

Other MRs

Maintenance Center

User Application Data

User Application Data

QoS Measurements

QoS Measurements

Evaluation of QoS measurements. Collecting of QoS measurements for SDN learning

Swap networks to match best robot for services for UEs

1406

302

TECHNIQUE FOR ROTATING MULTI-SECTOR ANTENNAS ON AIRCRAFTS

CROSS-REFERENCE TO RELATED APPLICATION

This application is a 35 U.S.C. § 371 national stage application of PCT International Application No. PCT/EP2020/070787 filed Jul. 23, 2020, the contents of which are hereby incorporated by reference herein.

TECHNICAL FIELD

The present disclosure generally relates to a technique for controlling multi-sector antennas. More specifically, and without limitation thereto, a method and a device are provided for rotating multi-sector antennas mounted on unmanned aircrafts.

BACKGROUND

The document US 2004/0219877 A1 describes a cellular-type wireless communications system comprising an airborne platform that reflects wireless communication signals from a centralized base station. Each cell corresponds to a geographic area, and the centralized base station is configured to send wireless communication signals to the airborne platform and receive wireless subscriber signals reflected of the airborne platform.

However, such an airborne antenna system can only provide radio access in a pattern of cells that is determined by the position of the centralized base station on the ground and the fixed curvature of the reflective surface underneath the airborne platform. Particularly, it is not possible to change the azimuth angle of the position of the cells relative to the airborne platform.

The document US 2017/0127293 A1 describes an airborne base station in-motion. The base station services wirelessly in a first position in a first region a first wireless client device by transmitting a first transmission radiation pattern encompassing the first wireless client device. After moving to a second position, the first transmission radiation pattern is adapted to a second transmission radiation pattern covering only a portion of a second region to service a second wireless client device.

While such a conventional base station in motion is highly flexible as to its region of radio coverage, serving one or more groups of radio devices requires a number of such base stations that is proportional to the number of radio devices.

SUMMARY

Accordingly, there is a need for a radio access network that provides radio access to one or more groups of radio devices more efficiently outside of the coverage of stationary or terrestrial base stations.

According to a method aspect, this need is met by a method of rotating one or more multi-sector antennas mounted on unmanned aircrafts of a radio access network (RAN). Each of the multi-sector antennas comprises multiple sectors. The multiple sectors of each of the multi-sector antennas are configured to provide radio access to radio devices in different azimuthal directions that are changeable relative to the aircraft and fixed relative to each other when rotating the respective one of the multi-sector antennas. The method is performed by at least one or each of the aircrafts of the RAN. The method comprises a step of determining signal strengths of radio signals exchanged between a first radio device and at least two of the multiple sectors of the multi-sector antenna mounted on the respective one of the aircrafts. The method further comprises a step of computing, based on the determined signal strengths, a first azimuthal direction for providing radio access to the first radio device. The method further comprises a step of rotating a first sector of the multiple sectors of the multi-sector antenna mounted on the respective one of the aircrafts in the computed first azimuthal direction.

By virtue of the multi-sector antenna, at least some embodiments provide radio access to the first radio device by means of the first sector of the multi-sector antenna, while at least one further sector of the multiple sectors other than first sector is configured to provide radio access to another one of the radio devices.

Using the first sector, same or further embodiments provide radio access to a first group of radio devices including the first radio device, while at least one further sector of the multiple sectors other than first sector is configured to provide radio access to another group of the radio devices.

Same or further embodiments of the technique allow decoupling avionics of the one or more aircrafts from providing radio access to the first radio device or the first group or radio devices by virtue of the step of rotating the multi-sector antenna. For example, the aircraft may fly on a closed trajectory that provides lift to the aircraft while a center of the closed trajectory is determined by (e.g., follows) a path of the first radio device.

In contrast to prior art systems of drones, which orient their antennas in the cardinal directions of Earth, embodiments of the technique can rotate their multi-sector antennas individually and/or in different azimuthal directions. Instead of a constant azimuthal direction relative to earth, embodiments of the aircrafts can keep the azimuthal direction aligned with the line of sight to a convoy as the convoy moves along a path, which benefits of the radio access (i.e., the radio coverage) provided by the aircraft.

The azimuthal directions may be defined from a point of view of the multi-sector antenna of the respective one of the aircrafts. The step of determining may comprise determining signal strengths in multiple azimuthal directions between the multi-sector antenna of the respective aircraft and the first radio device among the radio devices.

Each of the multi-sector antennas may have one axis of the rotation. All of the multiple sectors of the respective multi-sector antenna may rotate about the one axis of rotation of the respective multi-sector antenna. Each of the multi-sector antennas may comprise at least 3 sectors, e.g., 4 or 6 sectors.

Each of the multi-sector antennas may be configured to provide radio access to radio devices covered by at least one of the multiple sectors of the respective one of the multi-sector antennas. Alternatively or in addition, each of the multiple sectors of each of the multi-sector antennas may be connected (e.g., by wire) to at least one of an antenna amplifier and baseband-processing circuitry (e.g., a baseband processors).

The baseband-processing circuitry may be located on board the aircraft. The baseband-processing circuitry may be configured to provide radio access according to a radio access technology (RAT), e.g., at least one of Wi-Fi, 3GPP GSM, 3GPP UMTS, 3GPP LTE and 3GPP NR.

The method may further comprise a step of exchanging the radio signals between the first radio device and each of the at least two of the multiple sectors of the multi-sector antenna mounted on the respective one of the aircrafts. The step of exchanging the radio signals may comprise receiving the radio signal from the first radio device at each of the at least two sectors and/or transmitting the radio signal to the first radio device from each of the at least two sectors.

Different sectors of each of the multi-sector antennas may be configured to provide radio access (e.g., to transmit and/or receive the radio signals) in different azimuthal directions. An azimuthal range (i.e. an azimuthal coverage, e.g. over ground) of each of the multiple sectors of the multi-sector antenna may be equal. For example, the multi-sector antenna may comprise a number of N sectors according to an N-fold rotational symmetry of the multi-sector antenna.

Each of the multi-sector antennas may be configured to provide radio access in all azimuthal directions (e.g., 360° in a horizontal plane). An overlap in the azimuthal range of neighboring sectors of the multi-sector antenna may be less than the azimuthal range of each of the multiple sectors of the multi-sector antenna. Alternatively or in addition, the different sectors of the multi-sector antenna may be azimuthally disjoint.

Each of the multiple sectors of the multi-sector antenna may have an azimuthal pattern of antenna gain (briefly: azimuthal gain pattern). A maximum of the azimuthal gain pattern may be at the azimuthal center of the azimuthal range of the respective sector. Alternatively or in addition, the step of rotating the first sector in the computed first azimuthal direction may comprise rotating the multi-sector antenna to align the maximum of the azimuthal gain pattern of the first sector and the computed first azimuthal direction.

The radio signals may comprise reference signals. The signal strength may be determined in terms of reference signal received power (RSRP). Alternatively or in addition, the radio signals may comprise user data and reference signals, which are multiplexed in at least one of a time domain and a frequency domain.

The method may be implemented by an antenna control system, e.g., for controlling the one or more multi-sector antennas and/or for providing radio access to one or more groups of radio devices.

Any group of radio devices, e.g., the first group of radio devices or each of the groups of radio devices, may comprise a convoy of vehicles. Each vehicle may provide the functionality of one of the radio devices. The convoy may be a column or platoon of vehicles, e.g., a convoy for protecting a person (e.g., a ViP convoy) or a platoon of trucks.

Any one of the unmanned aircrafts may be referred to as a mobile robot (MR). By virtue of the multi-sector antenna mounted on the respective one (e.g., each) of the MRs, the MR may provide the functionality of a radio base station (RBS).

The unmanned aircraft may be a drone, e.g. an RBS drone. The technique may be implemented to provide, by one or more RBS on each of one or more drones, at least one of wireless coverage; radio coverage; and radio access.

The unmanned aircrafts (e.g., a swarm of RBS drones) may be receiving measurements of signal strength from the first radio device (e.g., a ViP UE) in a vehicle convoy that is driving on the surface according to the determining step. If the power of the signal strength becomes lower in its first sector and higher in another sector neighbor the first sector according to the computing step, the multi-sector antennas of each aircraft are rotated to keep the best signal in first sector, e.g., to avoid a handover, according to the rotating step.

The rotating step may comprise rotating the multi-sector antenna autonomously by any of the aircrafts (e.g., any RBS Drone or MR).

The plurality of aircrafts may comprise a master MR (e.g., master RBS drone) and at least one slave MR (also servant MR or slave RBS drone). At the servant MR, the step of computing of the method may comprise receiving an antenna direction as the first azimuthal direction from the master MR. The step of rotating may comprise rotating the multi-sector antenna in the servant MR after control antenna direction received from the master MR.

The method may further comprise a step of transmitting measurements of the slave MR to the master MR. The measurements may be performed by a radio device in radio connection with the slave MR. The measurements may comprise results for different sectors of the multi-sector antenna.

In one variant, the measurements may be transmitted directly from the radio device to the master MR measurements. In another variant, the method may comprise forwarding the measurements received by the slave MR to the master MR. Alternatively or in addition, the method implemented at the slave MR may comprise receiving antenna control signals from the master MR.

The aircrafts may exchange information indicative of downlink (DL) throughput of the radio devices (e.g., of the first radio device) provided through the respective aircrafts. The information as to the throughput may be compared between the aircrafts. The method may further comprise generating DL packets with random content to equalize the DL throughput of different radio devices.

Alternatively or in addition, information as to uplink (UL) throughput through the aircrafts may be exchanged between the aircrafts and transmitted to the radio devices (e.g., the radio devices other than the first radio device). The other radio devices may generate UL packets with random content to equalize the UL throughput of different radio devices.

The step of generating random user data (e.g., at the aircraft for equalizing DL throughput or at the radio device for equalizing UL throughput) may comprise writing simple patterns ending them with a long integer calculated with as next value from Fibonacci Sequence for each next packet and encrypting the random packets with a dedicated public key of the respective radio device. At the radio device, the method may comprise detecting of random content by detecting packets encrypted with the dedicated private key and/or digitally signed with the dedicated public key. The method further comprises a step of discarding packets after checking the digital signature of the random content.

The unmanned aircrafts (e.g., the swarm of RBS drones) may split (i.e., separate). The method may further comprise providing daisy chains of aircrafts for each separated swarm.

The step of determining the signal strengths may be implemented by detecting the azimuthal angle of the first radio device, e.g., in terms of a maximum of the signal strengths and/or a line of sight.

Optionally, the step of rotating of the multi-sector antenna may be implemented by antenna steering.

The multi-sector antenna may comprise multiple antenna ports (briefly: ports). Each port may be connected to one of the multiple sectors, e.g., at least one antenna element for the respective sector.

The step of determining may comprise performing a channel estimation, which may result in a set of complex-valued gains (e.g., phase values) for at least one or each of the plurality of radio devices. Each of the gains may be associated with one of the ports.

Reference signals may be received at the multi-sector antennas from at least one or each of the radio devices, e.g., from the first radio device. The channel estimation may be based on the received reference signals. Different sets of gains may be determined for different radio devices of the plurality of radio devices and/or for different sectors of the multi-sector antenna. Alternatively or in addition, reference signals may be transmitted from the multi-sector antennas. Different reference signals may be transmitted (e.g., within the same sectors) through different ports of the multi-sector antenna and/or on different beams (e.g., during beam sweeping). The method may further comprise a step of receiving a control message from the first radio device or from one or each of the plurality of radio devices. Based on the transmitted reference signals, the control message may be indicative of a set of the gains, a precoding matrix, a beam index of one of the beams and/or an angle of one of the azimuthal directions for the respective radio device, e.g., the first radio device. For example, the control message may comprise a precoding matrix index (PMI).

The step of rotating may comprise applying the set of the gains, the precoding matrix, the beam according to the beam index, e.g., for reception and/or transmission through the multi-sector antenna from or towards the respective radio device. Each set of gains may define one of the sectors of the multi-sector antenna. Each set of gains may define a widebeam transmission and/or a widebeam reception based on the channel estimation within the respective sector. Alternatively or in addition, the step of rotating may comprise physically rotating the multi-sector antenna according to the angle.

A channel from the multi-sector antenna to the respective radio device may be a multiple-input multiple-output (MIMO) channel or a multiple-input single-output (MISO) channel. The channel may comprise a directional gain (e.g., for a beamforming transmission or beamforming reception) at the multi-sector antenna, which may be controlled in the rotating step, e.g., according to the determined set of complex-valued gains or the received control message.

The signal strengths may be determining based on the reception of reference signals using channel reciprocity and/or the transmission of reference signals using the control message.

The step of computing may comprises determining the greatest signal strength among the determined signal strengths, and wherein the sector with which the radio signal having the greatest signal strength is exchanged determines the first azimuthal direction.

The maximum of the azimuthal gain pattern and/or the azimuthal center of the azimuthal range of the sector with which the radio signal having the greatest signal is exchanged may determine the first azimuthal direction.

The step of computing may comprise interpolating the determined signal strengths as a function of azimuthal directions of the at least two of the multiple sectors. A maximum of the interpolated function determines the first azimuthal direction between the azimuthal directions of the at least two of the multiple sectors.

The maximum of the azimuthal gain pattern and/or the azimuthal center of the azimuthal range of the respective at least two of the multiple sectors may determine the respective azimuthal directions of the determined signal strengths for the interpolating. By means of the interpolating, the first azimuthal direction may be computed with an azimuthal granularity or an azimuthal resolution that is finer than the multiple sectors, e.g., finer than 360°/N.

Alternatively or in addition, an azimuthal angle representing the first azimuthal direction or an azimuthal angle of the step of rotating the multi-sector antenna may be proportional to a signal strength difference between the greatest signal strength among the determined signal strengths and a signal strength of the radio signal exchanged between the first sector of the multi-sector antenna and the first radio device before rotating the multi-sector antenna.

The rotating of the first sector in the first azimuthal direction may correspond to an increase in the signal strength of the radio signals exchanged between the first radio device and the first sector of the multi-sector antenna.

The signal strengths may be repeatedly determined. The first azimuthal direction may be repeatedly computed based on the determined signal strengths. The multi-sector antenna may be repeatedly rotated to provide the radio access to the first radio device while the respective one of the aircrafts is moving on a trajectory relative to the first radio device and/or over ground.

The signal strengths may be repeatedly determined. The first azimuthal direction may be repeatedly computed based on the determined signal strengths. The multi-sector antenna may be repeatedly rotated to provide the radio access to the first radio device while the first radio device (304) is moving along a path.

The multi-sector antenna may be repeatedly rotated to provide and/or receive the greatest signal strength among the determined signal strengths while the respective one of the aircrafts is moving on a trajectory over ground and/or the first radio device is moving on a path.

By moving on a closed trajectory, e.g., over ground, the aircraft may be a fixed-wing aircraft. By moving on a closed trajectory, e.g., relative to the first radio device, the aircraft may be a fixed-wing aircraft providing radio access to the first radio device.

The first radio device may be located inside or outside of the closed trajectory. The first radio device may be inside or outside of the closed trajectory depending on whether the closed trajectory (e.g., vertically) projected over ground encompasses the first radio device or not.

Herein, "ground" may encompass land (i.e., soil) or water (i.e., air-water interface). Alternatively or in addition, the radio devices (e.g., the first radio device) may be a vehicle moving on land or a ship moving on water.

The at least one or each of the aircrafts may be moving on a closed trajectory relative to the first radio device and/or over ground. The first radio device may be located outside of the closed trajectory and/or a distance between the first radio device and a center of the closed trajectory may be greater than a diagonal of the closed trajectory.

The diagonal of the closed trajectory may be the greatest (e.g., horizontal) line segment or linear section of the closed trajectory. The center of the closed trajectory may be a centroid of the closed trajectory. The closed trajectory may be a circle or ellipse.

By virtue of the first radio device being outside of the closed trajectory projected over ground, the rotating of the multi-sector antenna may comprise an oscillating rotation back and forth by less than 180°. By virtue of the distance between the first radio device and the center of the closed trajectory being greater than the diagonal of the closed trajectory, the rotating of the multi-sector antenna may comprise an oscillating rotation back and forth by less than 90°. In each case, a frequency of the oscillation may be equal to a frequency of the aircraft orbiting the closed trajectory.

At least one second radio device other than the first radio device may be located inside of the closed trajectory.

The aircraft may orbit the at least one second radio device.

The at least one or each of the aircrafts may be moving on a closed trajectory relative to the first radio device and/or over ground. The first radio device may be inside the closed trajectory.

If the first radio device is inside the closed trajectory over ground, the closed trajectory may also be referred to as encompassing the first radio device. By virtue of the closed trajectory encompassing the first radio device, the rotating of the multi-sector antenna may comprise a continuous rotation and/or a rotation in the same direction. A frequency of the continuous rotation of the multi-sector antenna may be equal to a frequency of the aircraft orbiting the closed trajectory.

At least one second radio device other than the first radio device may be located outside of the closed trajectory.

At least one second sector of the multiple sectors other than the first sector provides radio access to the at least one second radio device.

The second sector of the multi-sector antenna, the first sector of which provides the radio access to the first radio device, may provide the radio access to the second radio device.

The multi-sector antenna may comprise multiple sectors of equal azimuthal range.

The step of determining the signal strengths may comprise measuring the signal strengths of the radio signals exchanged between the first radio device and each of the multiple sectors of the multi-sector antenna.

The step of determining the signal strengths may comprises rotating the multi-sector antenna for measurement and/or measuring the signal strength between the first sector of the multi-sector antenna and the first radio device during the rotation for measurement.

The multi-sector antenna may comprise N sectors and determining the signal strengths comprises rotating the multi-sector antenna by an angle of 360°/N. The sector exchanging the greatest signal strength with the first radio device among the N sectors may be the first sector.

The multi-sector antenna may be rotated by controlling a rotational actuator. The rotational actuator may comprise a servomotor and/or a stepper motor. The multi-sector antenna may be mounted on a shield rotatable by the rotational actuator. The baseband-processing circuitry may be mounted on the shield.

An axis of the rotation may be vertical.

The signal strengths may comprise at least one of a received power, a received signal strength indication (RSSI), a reference signal received power (RSRP), and a reference signal received quality (RSRQ).

The step of determining the signal strengths may comprise transmitting reference signals from each of the multiple sectors of the multi-sector antenna of the respective aircraft to the first radio device and/or receiving a measurement report from the first radio device. The measurement report may be indicative of the signal strengths of the reference signals measured at the first radio device.

A first one of the aircrafts of the RAN may determine the signal strengths and computes the first azimuthal direction based on the determined signal strengths. The method may further comprise a step (e.g., performed by the first aircraft) of transmitting a first control message from the first aircraft to a second one of the aircraft of the aircrafts of the RAN other than the first aircraft. The first control message may be configured to initiate rotating the multi-sector antenna mounted on the second aircraft according to the first control message.

The first control message may be indicative of at least one of a position of the first aircraft, the first azimuthal direction for the multi-sector antenna mounted on the first aircraft, a position of the first radio device computed based on the position of the first aircraft and the first azimuthal direction for the multi-sector antenna mounted on the first aircraft, a target position of the second aircraft computed based on the position of the first aircraft and the first azimuthal direction for the multi-sector antenna mounted on the first aircraft, and a target first azimuthal direction for the multi-sector antenna mounted on the second aircraft for providing radio access to the first radio device. Optionally, the method further comprises a step of computing the target first azimuthal direction based on at least one of the position of the first aircraft, the target position of the second aircraft, and the first azimuthal direction for the multi-sector antenna mounted on the first aircraft.

Herein, any azimuthal direction (e.g., the first azimuthal direction or the target first azimuthal direction) may be represented by an azimuthal angle, e.g., relative to the first aircraft or relative to the aircraft for which multi-sector antenna the azimuthal direction is computed. Alternatively or in addition, the target first azimuthal direction for the multi-sector antenna mounted on the second aircraft may be computed relative to a baseline through the position of the first aircraft and the target position of the second aircraft, wherein the azimuthal angle representing the target first azimuthal direction is equal to 180° minus the azimuthal angle representing the first azimuthal direction.

The method may further comprise the step performed by the first aircraft of receiving a second control message from the second aircraft at the first aircraft. The second control message may be configured to initiate the step of rotating the multi-sector antenna mounted on the first aircraft according to the second control message. Optionally, the step of computing the first azimuthal direction for providing radio access to the first radio device is further based on the second control message.

The second control message may be indicative of at least one of a position of the second aircraft, a first azimuthal direction for the multi-sector antenna mounted on the second aircraft for providing radio access to the first radio device, a position of the first radio device, a target position of the first aircraft for providing radio access to the first radio device, a target first azimuthal direction for the multi-sector antenna mounted on the first aircraft for providing radio access to the first radio device.

For example, only the first aircraft of the aircrafts computes the first azimuthal direction. The second aircraft of the aircrafts may rely on the target first azimuthal direction for rotating its multi-sector antenna.

Alternatively or in addition, each of the aircrafts of the RAN may determine the signal strengths and compute the first azimuthal direction for its multi-sector antenna (i.e., the multi-sector antenna mounted on the respective one of the aircrafts). The step of determining the signal strengths may comprise transmitting a reference signal from the multi-sector antenna of each of the aircrafts of the RAN to the first radio device.

A position of the first radio device may be based on the first azimuthal direction computed for the multi-sector antenna of the respective one of the aircrafts of the RAN and a distance between the first radio device and the respective one of the aircrafts. Optionally, the distance may be determined based on at least one of the radio signal strength and a Time of Flight (ToF) of a radio signal exchanged between the first radio device and the respective aircraft.

A position of the first radio device may be based on the first azimuthal direction computed by at least two or each of the aircrafts of the RAN for the first radio device.

The first azimuthal direction computed for the multi-sector antenna of the respective one of the aircrafts may be an Angle of Arrival (AoA) of the radio signal received at the respective one of the aircrafts.

Each of the aircrafts of the RAN may transmit a reference signal to the first radio device from each of the multiple sectors of the multi-sector antenna mounted on the respective one of the aircrafts. A first one of the aircrafts of the RAN may determine the signal strengths based on measurement reports received for each of the multiple sectors of each of the aircrafts of the RAN and/or may compute, based on the determined signal strengths, a first azimuthal direction for each of the aircrafts of the RAN for providing radio access to the first radio device. The method may further comprise transmitting a first control message from the first aircraft to each of the aircrafts of the RAN other than the first aircraft. The first control message may be indicative of the first azimuthal direction computed for the respective one of the aircrafts.

The first aircraft may receive, from the first radio device, measurement reports based on the reference signals transmitted from the different aircrafts of the RAN. Each of the measurement reports may be indicative of the signal strengths of the respective one of the reference signals or for each sector of the respective one of the multi-sector antennas.

The first aircraft may receive the measurement reports directly from the first radio device or forwarded by the aircrafts of the RAN other than the first aircraft.

At least one of the step of determining the signal strengths, the step of computing the first azimuthal direction and the step of rotating are performed responsive to the signal strength of the radio signal exchanged between the first sector of the multi-sector antenna and the first radio device decreases below a predetermined threshold.

The step of computing the first azimuthal direction based on the determined signal strengths comprises applying the determined signal strengths to an input layer of an artificial neural network (ANN). An output layer of the ANN may be indicative of the first azimuthal direction.

The output layer of the ANN may be indicative of the first azimuthal direction in terms of an azimuthal angle of the rotation or an azimuthal angle between a current orientation of the multi-sector antenna and a rotated orientation of the multi-sector antenna with the first sector being rotated in the first azimuthal direction.

The step of determining the signal strengths my comprise determining the signal strengths of radio signals exchanged between each of the multiple sectors of the multi-sector antennas mounted on each of the aircrafts of the RAN.

The step of computing may comprise applying the determined signal strengths to the input layer of the ANN. The output layer of the ANN may be indicative of the first azimuthal direction for each of the aircrafts of the RAN.

For example, the first aircraft may compute, based on the determined signal strengths, the first azimuthal direction for each of the aircrafts of the RAN by means of the ANN.

The step of computing the first azimuthal direction may further comprise applying positions or trajectories of each of the aircrafts to the input layer of the ANN.

The positions of the aircrafts of the RAN may be relative positions between the aircrafts of the RAN. For example, each position may be represented relative to the first aircraft.

The trajectories may be past trajectories or predetermined trajectories.

The step of determining further comprises determining a Quality of Service (Qos) measured at the first radio device for the radio access provided by the RAN and the step of computing the first azimuthal direction further comprises applying the determined QoS to the input layer of the ANN.

The QoS measured for the radio access provided by the RAN may comprise at least one of a packet loss, a bit rate, a data throughput, a transmission delay, an availability, and a jitter, e.g., for a radio bearer between the first radio device and the RAN. Determining the QoS measured at the first radio device may comprise receiving a measurement report from the first radio device that is indicative of the QoS.

The step of determining may further comprise determining weather conditions measured in an environment of the aircrafts of the RAN and the step of computing the first azimuthal direction further comprises applying the determined weather conditions to the input layer of the ANN.

The output layer of the ANN may be further indicative a predicted QoS.

The predicted QoS may also be referred to as a predicted score. Alternatively or in addition, the predicted QoS may comprising at least one of a predicted data rate, a predicted latency, and a predicted QoS Class Identifier (QCI).

At least one pair of cells comprising a downlink secondary cell (DL sCell) and an uplink secondary cell (UL sCell) of the respective aircraft may be paired with an application executed by the first radio device to provide the radio access to the application. The method may further comprise receiving a score for each pair of DL sCell and UL sCell from the paired application.

The score may be indicative of fulfilment of a QoS requirement of the application. The score may be received in a report to the RAN, preferably to the respective aircraft.

A set of pairs associated with the application may be associated with an aggregated score being the sum of the scores of the pairs in the set. A set of pairs having an aggregated score below a median of aggregated scores among all sets may be marked for swapping.

At least one or each pair having a score below a median of scores among all pairs may be dissociated from the application and added to a list of available pairs. Optionally, the dissociation and/or the adding may be subject to the pair being in the set marked for swapping.

The method may further comprise swapping at least one or each pair having a score below a median of scores among all pairs with another pair having a score below a median of scores among all pairs.

At least two of the aircrafts may provide the radio access to the first radio device using Coordinated Multi Point (COMP) transmission or reception in an uplink or a downlink connection for data, preferably continuously measuring the latency of transferred data packets. At least one of the aircrafts may provide the radio access to an application of the first radio device depending on the measured latency of the aircraft and a latency sensitivity of the application.

At least two of the aircrafts may provide the radio access to the first radio device through a backhaul link to different mobile network operators (MNOs). The at least two aircrafts may be located at a RAN edge of the different MNO. An application executed by the first radio device may be bound to each of the two MNOs.

The radio access provided to the application may be swapped from one of the aircrafts providing the radio access through a first MNO of the MNOs to another aircraft providing the radio access through a second MNO of the MNOs, preferably without wireless network involvement. The swapping of the radio access may be triggered based on an evaluation of QoS measured by each aircraft with respect to applications of the first radio device and/or QoS feedback from applications of the first radio device received by each of the aircrafts.

The evaluation may be performed by one aircraft based on QoS measured by the one aircraft and QoS measured by aircrafts other than the one aircraft and reported to the one aircraft, or based on QoS feedback received by the one aircraft from the first radio device or received and forwarded by the aircrafts other than the one aircraft to the one aircraft.

The evaluation may be performed by a maintenance center configured for remote steering of the aircrafts based on QoS measured and transmitted by each aircraft, or based on a QoS feedback from the first radio device and forwarded by each aircraft.

Swapping of radio access networks may be initiated due to interference and/or jamming of the radio access, a position of the one or all aircrafts, geographic obstacles along the path of the first radio device, and/or weather conditions.

A subset of the radio devices may comprise the first radio device. The subset may move on a common path as a convoy, optionally wherein the first radio device is centered within the convoy.

The subset may split into multiple temporary subsets with a primary subset comprising the first radio device and at least one secondary subset not comprising the first radio device. Each secondary subset may alter its path and move in a different direction than the primary subset. One of the aircrafts may be selected for each secondary subset, the one aircraft determining signal strengths in multiple azimuthal directions between its multi-sector antenna and one radio device of the secondary subset, and rotating its multi-sector antenna by an azimuthal angle to provide the highest signal strength among the determined signal strengths between a main sector of the multi-sector antenna and the one radio device of the secondary subset.

The at least one aircraft providing radio access to the at least one secondary subset may generate random downlink packets based on the uplink throughput measured by the aircrafts providing radio access to the first radio device. The measurements may be transmitted from the aircrafts providing radio access to the first radio device to the at least one aircraft providing radio access to the at least one secondary subset, either directly or via a maintenance center for remote steering of the aircrafts.

Each of the radio devices may be situated and/or may be part of a terrestrial vehicle, a water-surface vehicle, an underwater vehicle or a flying vehicle.

The one or each of the aircrafts may be a fixed-wing aircraft. The multi-sector antenna may be rotatably mounted on a body of the fixed-wing aircraft. The orientation of the multi-sector antenna may be rotated by rotating the multi-sector antenna relative to a body of the fixed-wing aircraft.

The body may comprise a fuselage or one or more wings of the one or each aircraft.

The multi-sector antenna may be rotatably mounted at a first wing of the one or each aircraft, optionally on a first pylon on the bottom side of the first wing. At least one of a device configured to performing the method and a power source of the multi-sector antenna may be mounted at a second wing of the one or each aircraft, optionally on a second pylon on the bottom side of the second wing.

Power may be provided by a power source to at least one of the multi-sector antenna and the device configured to performing the method. The power source may be collocated with at least one of the multi-sector antenna and the device configured to performing the method.

Alternatively or in addition, power may be provided to the multi-sector antenna by a power source of the one or each aircraft.

At least one of the multi-sector antenna and the power source may be arranged in a capsule and/or mounted on a rotational actuator for the rotation. The power source may be rotated in the same or the opposite direction as compared to the rotation of the antenna system.

The method may further comprise communicating with another one of the aircraft (302) of the RAN. The communication may use at least one of directional and modulated light of a light amplification by stimulated emission of radiation (LASER); a directional and modulated microwave of a microwave amplification by stimulated emission of radiation (MASER); directional and modulated radiation of an Infra-Red Amplification by Stimulated Emission of Radiation (IRASER); a backhaul radio link; and an X2 Application Protocol (X2AP).

The technique may be implemented at one or more of the aircrafts of the RAN serving the one or more radio devices. The method may be performed by any one of the aircrafts acting as a base station and/or a cell of the RAN. The base station (e.g., the baseband-processing circuitry) may be configured to provide radio access to any one of the radio devices, e.g., according to a radio access technology (RAT) specified by 3GPP.

Any one of the radio devices may be configured for peer-to-peer communication (e.g., on a sidelink) and/or for accessing the RAN (e.g. on an uplink and/or a downlink). The radio device may be a user equipment (UE, e.g., a 3GPP UE), a mobile or portable station (STA, e.g. a Wi-Fi STA), a device for machine-type communication (MTC), a device for narrowband Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for rotating one or more multi-sector antennas mounted on unmanned aircrafts of a radio access network (RAN) is provided. Each of the multi-sector antennas comprises multiple sectors, the multiple sectors of each of the multi-sector antennas being configured to provide radio access to radio devices in different azimuthal directions that are changeable relative to the aircraft and fixed relative to each other when rotating the respective one of the multi-sector antennas. The device comprises memory operable to store instructions and processing circuitry operable to execute the instructions, such that the device is operable to determining signal strengths of radio signals exchanged between a first radio device and at least two of the multiple sectors of the multi-sector antenna mounted on the respective one of the aircrafts. The device is further operable to compute, based on the determined signal strengths, a first azimuthal direction for providing radio access to the first radio device. The device is further operable to rotate a first sector of the multiple sectors of the multi-sector antenna mounted on the respective one of the aircrafts in the computed first azimuthal direction.

The device may further be operable to perform any one of the steps of the method aspect.

As to a second device aspect, a device for rotating one or more multi-sector antennas mounted on unmanned aircrafts of a radio access network (RAN) is provided. Each of the multi-sector antennas comprises multiple sectors, the multiple sectors of each of the multi-sector antennas being configured to provide radio access to radio devices in different azimuthal directions that are changeable relative to the aircraft and fixed relative to each other when rotating the respective one of the multi-sector antennas. The device is configured to determine signal strengths of radio signals exchanged between a first radio device and at least two of the multiple sectors of the multi-sector antenna mounted on the respective one of the aircrafts; computing, based on the determined signal strengths, a first azimuthal direction for providing radio access to the first radio device; and rotating a first sector of the multiple sectors of the multi-sector antenna mounted on the respective one of the aircrafts in the computed first azimuthal direction.

The device may be further configured to perform any one of the steps of the method aspect.

As to a third device aspect, an unmanned aircraft of a radio access network (RAN) is provided. The aircraft is configured to communicate with a user equipment (UE) through a radio interface including a multi-sector antenna mounted on the aircraft. The multi-sector antenna comprises multiple sectors, the multiple sectors being configured to provide radio access to the UE in different azimuthal directions that are changeable relative to the aircraft and fixed relative to each other when rotating the respective one of the multi-sector antennas. The aircraft may further comprise processing circuitry configured to determine signal strengths of radio signals exchanged between a first radio device and at least two of the multiple sectors of the multi-sector antenna mounted on the aircraft;

compute, based on the determined signal strengths, a first azimuthal direction for providing radio access to the first radio device; and rotate a first sector of the multiple sectors of the multi-sector antenna mounted on the aircraft in the computed first azimuthal direction.

The processing circuitry may be further configured to execute any one of the steps of the method aspect.

As to a system aspect, a communication system including a host computer is provided. The host computer comprises processing circuitry configured to provide user data and a communication interface configured to forward user data to a cellular radio network for transmission to a UE. The UE comprises a radio interface. The cellular network comprises processing circuitry (e.g., in the aircrafts) that is configured to execute the any one of the steps of the method aspect.

The communication system may further include the UE.

The radio network may further comprise a (e.g., airborne) base station (or a radio device functioning as a gateway) which is configured to communicate with the UE. The base station (or the radio device functioning as a gateway) may comprise processing circuitry configured to execute the any one of the steps of the method aspect.

The processing circuitry of the host computer may be configured to execute a host application, thereby providing the user data. A processing circuitry of the UE may be configured to execute a client application associated with the host application.

The device, the aircraft, the UE, the system or any node or station for embodying the technique may further include any feature disclosed in the context of the method aspect, and vice versa. Particularly, any one of the units and modules, or a dedicated unit or module, may be configured to perform or trigger one or more of the steps of any one of the method aspects.

BRIEF DESCRIPTION OF THE DRAWINGS

Further details of embodiments of the technique are described with reference to the enclosed drawings, wherein:

FIG. 1 shows a schematic block diagram of an embodiment of a device for rotating a multi-sector antenna mounted on an unmanned aircraft of a RAN;

FIG. 2 shows a flowchart for an embodiment of a method of rotating a multi-sector antenna mounted on an unmanned aircraft of a RAN, which method is implementable by the device of FIG. 1;

FIGS. 8A to 8C schematically illustrate embodiments of an artificial neural network for implementing a computation module of the device of FIG. 1;

DETAILED DESCRIPTION

Figure 3:
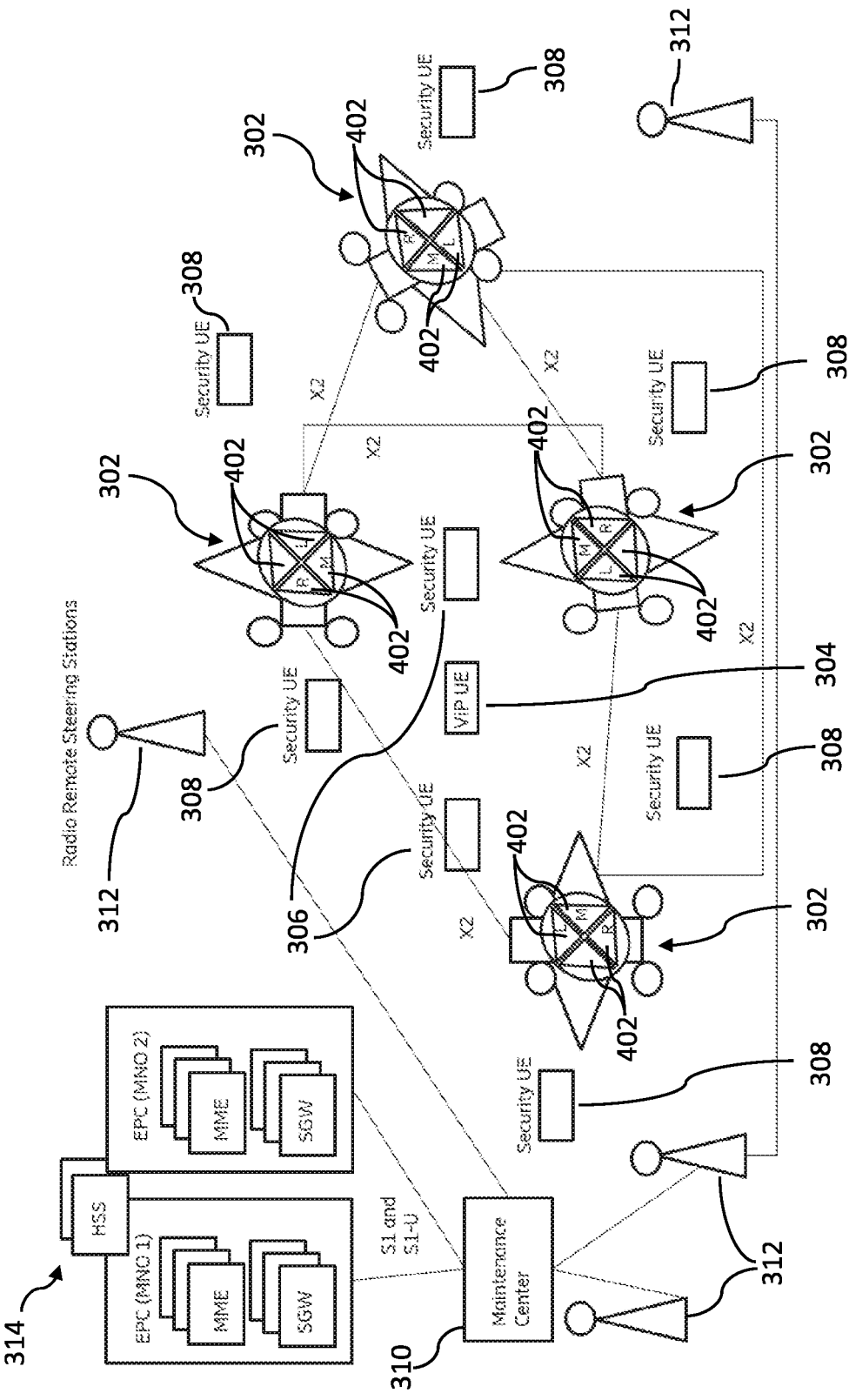
FIG. 3 schematically illustrates an embodiment of a wireless network for implementing the device of FIG. 1 and the method of FIG. 2.

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented using any other radio access technology (RAT), including Long Term Evolution (LTE) or a successor thereof according to 3GPP, Universal Mobile Telecommunications System (UMTS) according to 3GPP, Global System for Mobile Communications (GSM) according to 3GPP, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using processing circuitry and/or software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising processing circuitry, e.g., at least one computer processor and memory coupled to the at least one processor, wherein the memory is encoded with one or more programs that may perform the functions and steps or implement the units and modules disclosed herein.

FIG. 1 schematically illustrates an embodiment of a block diagram of a device for rotating one or more multi-sector antennas mounted on unmanned aircrafts of a RAN. The device is generically referred to by reference sign 100.

Each of the multi-sector antennas comprises multiple sectors. The multiple sectors of each of the multi-sector antennas are configured to provide radio access to radio devices in different azimuthal directions that are changeable relative to the aircraft and fixed relative to each other when rotating the respective one of the multi-sector antennas.

The device may be implemented by at least one or each of the aircrafts of the RAN.

The device 100 comprises a determination module 102 that determines signal strengths of radio signals exchanged between a first radio device and at least two of the multiple sectors of the multi-sector antenna mounted on the respective one of the aircrafts. The device 100 further comprises a computation module 104 that computes, based on the determined signal strengths, a first azimuthal direction for providing radio access to the first radio device. The device 100 further comprises a rotation module 106 that rotates 206 a first sector of the multiple sectors of the multi-sector antenna mounted on the respective one of the aircrafts in the computed first azimuthal direction.

Any of the modules of the device 100 may be implemented by units configured to provide the corresponding functionality.

While the technique is described for multi-sector antennas that are rotatably mounted on an aircraft to the benefit of clarity and conciseness, the technique is readily applicable to radio devices comprising more than one multi-sector antenna and/or more than one axis of rotation for rotating the multi-sector antenna.

The multi-sector antenna may comprise an array of antenna elements arranged at the circumference of the multi-sector antenna.

The device 100 may be part of the RAN. The device 100 may be configured to provide the functionality of a base station of the RAN, a node connected to the RAN for controlling the base station or a combination thereof.

Any of the radio devices may be wirelessly connected or connectable to the RAN. The radio device may be embodied by or at a device configured for accessing the RAN, for example in a vehicle configured for radio-connected driving. Optionally, the radio device may be wirelessly connected or connectable to another radio device, for example another vehicle. The radio device may be embodied by or at a radio device configured for wireless ad hoc connections.

The device 100 may encompass a network controller (e.g., a Wi-Fi access point) or a radio access node (e.g. a 3G Node B, a 4G eNodeB or a 5G gNodeB) of the RAN. The device 100 may be configured to provide radio access.

Alternatively or in addition, any of the radio devices may include a mobile or portable station or a radio device connectable to the RAN. Each radio device may be a user equipment (UE), a device for machine-type communication (MTC) and/or a device for (e.g., narrowband) Internet of Things (IoT). Two or more radio devices may be configured to wirelessly connect to each other, e.g., in an ad hoc radio network or via 3GPP sidelinks.

FIG. 2 shows a flowchart for a method 200 of rotating one or more multi-sector antennas mounted on unmanned aircrafts of a RAN. Each of the multi-sector antennas comprises multiple sectors. The multiple sectors of each of the multi-sector antennas are configured to provide radio access to radio devices in different azimuthal directions that are changeable relative to the aircraft and fixed relative to each other when rotating the respective one of the multi-sector antennas.

The method 200 may be performed by the device 100 and/or the aircraft, e.g., using the multi-sector antenna rotated by the device 100 and/or mounted on the aircraft. For example, the modules 102, 104 and 106 of the device 100 and/or the aircraft may perform the steps 202, 204 and 206, respectively.

The method 200 comprises a step 202 of determining signal strengths of radio signals exchanged between a first radio device and at least two of the multiple sectors of the multi-sector antenna mounted on the respective one of the aircrafts. The method 200 further comprises a step 204 of computing, based on the determined signal strengths, a first azimuthal direction for providing radio access to the first radio device. The method 200 further comprises a step 206 of rotating a first sector of the multiple sectors of the multi-sector antenna mounted on the respective one of the aircrafts in the computed first azimuthal direction.

FIG. 3 shows an embodiment of a wireless network comprising an embodiment the RAN and an embodiment of a core network 314 connected to the RAN. For concreteness, and not limitation, the embodiment of the RAN provides the radio access according to 3GPP LTE. The RAN comprises a plurality of aircrafts 302, each comprising an embodiment of the device 100 for performing the method 200.

The RAN may comprise a maintenance center 310 providing interfaces to the core network 314 through a plurality of radio remote steering stations 312 for each of the plurality of aircrafts 302 (e.g., to each device 100 embodied by the respective aircraft 302). The interfaces may include an S1 interface to the mobility management entity (MME) and/or an S1-U interface to the serving gateway (S-GW).

Any of the embodiments of the method 200 may control the aircrafts 302 (also referred to as RBS Mobile Robot or MR) to form a swarm of airborne base stations providing radio access to the first radio device 304 or to a first group of radio devices (also referred to as UEs), e.g., a convoy (also referred to as column), including the first radio device 304. For example, each of the aircrafts 302 (e.g., the device 100 aboard the aircraft 302) may comprise an avionics module configured to fly the aircraft 302 over and/or before and/or after and/or on the sides of the first radio device 304 or the first group of radio devices 304 and 306.

Each of the aircrafts 302 (e.g., the device 100 aboard the aircraft 302) is configured to rotate according to the step 206 its multi-sector antenna to point in the first azimuthal direction of the column direction of moving. The first sector 402 is labeled "M".

The wireless network comprises Mobile Robots (MRs) for serving (i.e., providing radio access to) the first radio device 304 or a person using the first radio device 304 (also referred to as Very Important Person User Equipment or ViP UE) and at least one second radio device 306 and/or 308 (also referred to as a Security User Equipment or Sec UE) accompanying the first radio device 304.

As a result, a group of the VIP UE 304 and the Sec UE 304 and/or 306 (e.g., a convoy of cars that is driving) is provided with radio coverage.

In any embodiment, the wireless network may comprise multiple backhaul mobile network operators (MNOs).

Embodiments of the device 100 may be configured for a stand-alone telecommunications network and/or an ad hoc radio network, e.g., for vehicular radio communications (V2X).

By means of the rotating multi-sector antennas 402, embodiments can extend or replace at least some V2X communications using the uplink and/or downlink between the radio devices 302, 306 and/or 308 and the aircrafts 302. By way of example, the European Telecommunications Standards Institute (ETSI) has defined two types of messages for road safety, including a Co-operative Awareness Message (CAM) and a Decentralized Environmental Notification Message (DENM), at least one of which may be implemented using the uplink and downlink though at least one of the aircrafts 302.

The CAM message enables vehicles, including emergency vehicles, to notify their presence and other relevant parameters in a broadcast fashion. Such messages target other vehicles, pedestrians and infrastructure, and are handled by their applications. CAM message also serves as an active assistance to safety driving for normal traffic. Conventionally, the availability of a CAM message is indicatively checked for every 100 ms, yielding a maximum detection latency requirement of on the order of (e.g., a maximum latency of) 100 ms for most messages.

A latency requirement for a warning message triggered by or for pre-crash sensing may be 50 ms, which can be fulfilled by embodiments of the technique, e.g., by a self-contained transmission. The self-contained transmission may include, e.g., in one or few transmission time intervals (TTIs), a reception of reference signals and control information followed by a data transmission and/or reception based on the determined channel coefficients and in accordance with the received control information.

The DENM message is event-triggered, e.g. by braking a vehicle implementing one of the devices 304, 306 and/or 308. Conventionally, the availability of a DENM message is also checked for every 100 ms, and the requirement of maximum latency is equal to or less than 100 ms. The package size of CAM and DENM messages varies from 100 bytes to 800 bytes or more bytes. A typical size is on the order of 300 bytes.

The CAM and/or DENM messages may be detected by each vehicle covered by the multi-sector antenna.

The technique may be applicable for any number of radio chains per aircraft 302. The radio chains may be referred to as, and particularly may be counted as, digital chains, units configured to perform a channel estimation or baseband ports. Furthermore, the technique is applicable in conjunction with any mapping from the sectors of the multi-sector antennas (e.g., physical antennal elements) to the radio chains.

Any one of the aircrafts 302 and/or radio devices 304, 306 and/or 308 may determine where the radio signal of its radio communication partner (i.e., the radio devices 304, 306 and/or 308 and aircrafts 302, respectively) comes from, for example by performing the method 200 in order to rotate the multi-sector antenna according to the step 206 in the first azimuthal direction.

A number of digital chains at the device 100 may be equal to the number of multiple sectors 402.

The device 100 at each of the aircrafts 302 may be configured to exchange configuration messages with the other aircrafts 302. By means of the configuration message, the aircrafts 302 may coordinate their trajectories and/or positions to form a swarm of Mobile Robots as the aircrafts 302 carrying Radio Base station (RBS) as the devices 100.

Alternatively or in addition, one of the aircrafts 302 (i.e., one of the devices 100) in the RAN may function as a Master MR. The other MRs 302 (Slave MRs) may be controlled by the Master MR, e.g., by receiving control messages from the Master MR 302. The control messages may control the Slave MRs 302 as to the trajectory of the Slave MR 302 and/or the rotation of the multi-sector antenna mounted on the Slave MR 302.

Preferably, the first sector 402' (also referred to as front sector "M") in each MR 302 is the one directly pointing to the first radio device 304 or the first group of radio devices including the first radio device 304.

Figure 4:
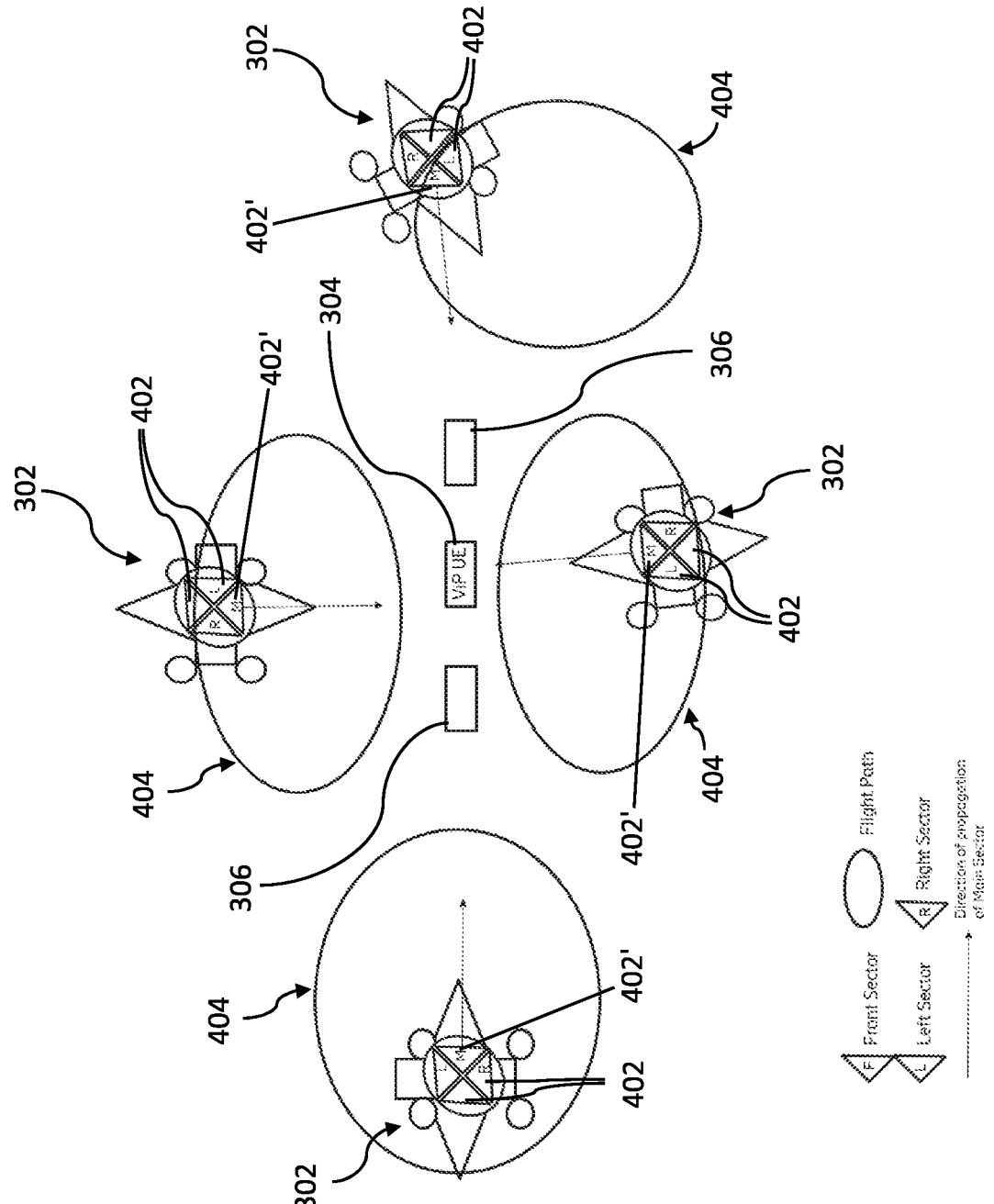
FIG. 4 schematically illustrates an embodiment of the RAN for implementing the device of FIG. 1 and the method of FIG. 2.

FIG. 4 shows an embodiment of the RAN comprising a swarm of aircrafts 302 as RBS drones around the first group of radio devices 304 and 306, e.g., a convoy, comprising the UEs 304 and 306.

The Master RBS 302 is collecting measurements from the ViP UE 304 that are indicative of the signal strength (e.g., of the radio signals transmitted from the Master RBS 302 in each sector 402 and received at the VIP UE 304) as an exemplary implementation of to the step 202.

Figure 5A:
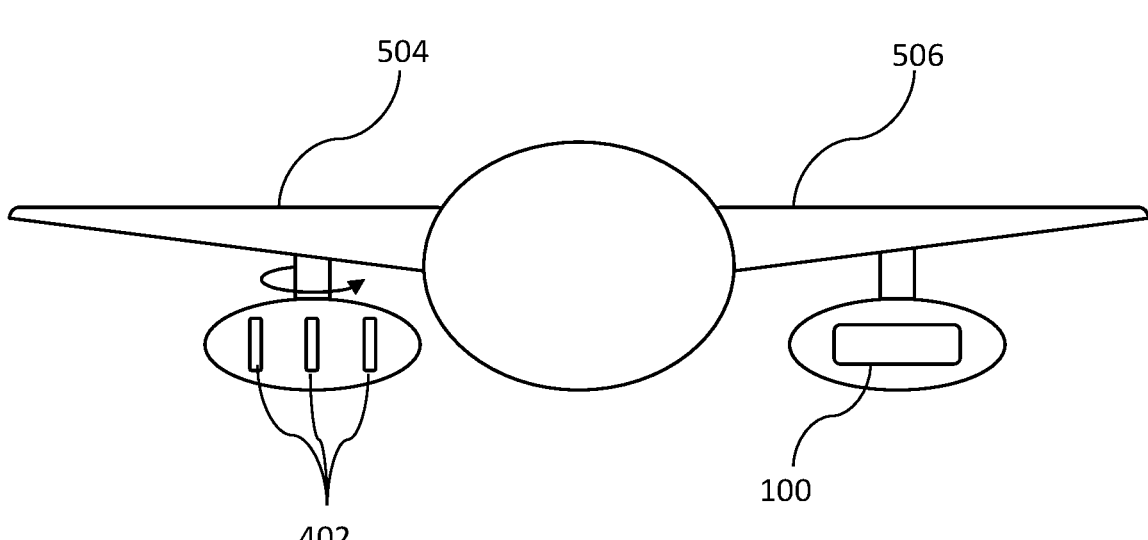
FIGS. 5A and 5B schematically illustrate embodiments of aircrafts carrying an embodiment of the device of FIG. 1.
Figure 5B:
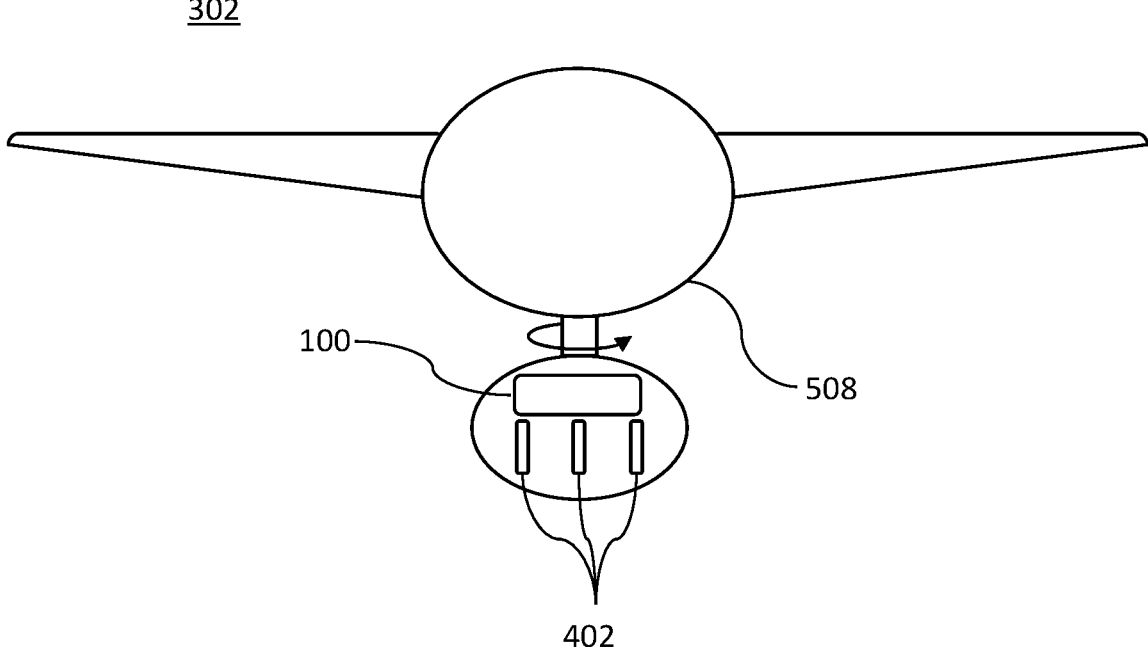

FIGS. 5A and 5B show schematically an embodiment of a fixed-wing aircraft 302. In a first variant of the embodiment, e.g. as shown in FIG. 5A, the multi-sector antenna is arranged at or in a first wing 504. Alternatively or in addition, the device 100 may be arranged in or at a second wing 506, e.g., opposite to the first wing 504. For example, the device 100 and/or the multi-sector antenna is arranged in a capsule attached to a pylon below the first wing and the second wing, respectively. Preferably, the multi-sector antenna and the device 100 (e.g., including a rechargeable battery system providing energy to the device 100 and the antenna) are arranged below different wings for balancing the weight of the aircraft 302.

In a second variant of the embodiment, e.g. as shown in FIG. 5B, the multi-sector antenna and/or the device 100 is arranged at or in a fuselage 508 of the aircraft 302. For example, the device 100 and/or the multi-sector antenna is arranged in a capsule attached to a pylon below the fuselage 508.

In any variant, the multi-sector antenna may be mounted on a shield rotatable by a servomotor or the python carrying at least the multi-sector antenna may be rotatable by a servomotor.

In any variant, the multi-sector antenna (briefly: antenna) may comprise multiple sectors 402 of equal angular range in the azimuth.

The signal strength may comprise at least one of Received Signal Strength Power (RSCP), Received Signal Strength Indication (RSSI), Reference Signal Receive Power (RSRP) and Reference Signal Strength Quality (RSRQ). For concreteness, and not limitation, the signal strength is called RSRP herein below.

Implementations of the method 200 can avoid a handover between neighboring sectors 402 of the multi-sector antenna.

In one implementation of the method 200, if the RSRP of the radio signal received from the first radio device 304 or the RSRP reported from the first radio device 304 becomes less in the first sector 402' (e.g., the front or main sector) than in the second sectors 402 (e.g., the side sectors) other than the first sector 402', the antenna is rotated to keep the best signal strength of the radio signal from the first radio device 304 in first sector 402'. In another implementation of the method 200, if the RSRP of the radio signal received from the first radio device 304 or the RSRP reported from the first radio device 304 decreases in the first sector 402' (e.g., the front or main sector) and (e.g., simultaneously) increases in the second sectors 402 (e.g., the side sectors) other than the first sector 402', the antenna is rotated to keep the best signal strength of the radio signal from the first radio device 304 in first sector 402'.

The angle of the rotation 206 may be proportional to a difference between the signal strength (e.g., the RSRP) of the first sector and the signal strength (e.g., the RSRP) of the second sector.

Any implementation of the method 200 may be combined with at least one of the following implementations of a control signaling. For concreteness, and not limitation, in the following implementations of the control signaling, the radio signal is transmitted from the multi-sector antenna (e.g., from each of the multiple sectors) of the aircraft 302, the signal strength is measured at the first radio device 304, and the signal strength is reported by the first radio device 304. In a variant any of the following implementations of the control signaling, the radio signal is transmitted from the first radio device 304 and the signal strengths are measured in the step 202 at the aircraft 302.

In any of the implementations, the control signaling may comprise at least one of: measurements of the signal strengths (e.g., determining 202 of the signal strengths by measuring the signal strengths at the respective aircraft 302), forwarding or reporting of results of the measurements (e.g., determining 202 of the signal strengths by receiving results of measurement from the respective radio device 304, 306, 308), and antenna control (e.g., rotating 206 of the one or more antennas) in the RAN (e.g., in the ViP swarm).

Figures 6A, 6B, 6C, 6D:
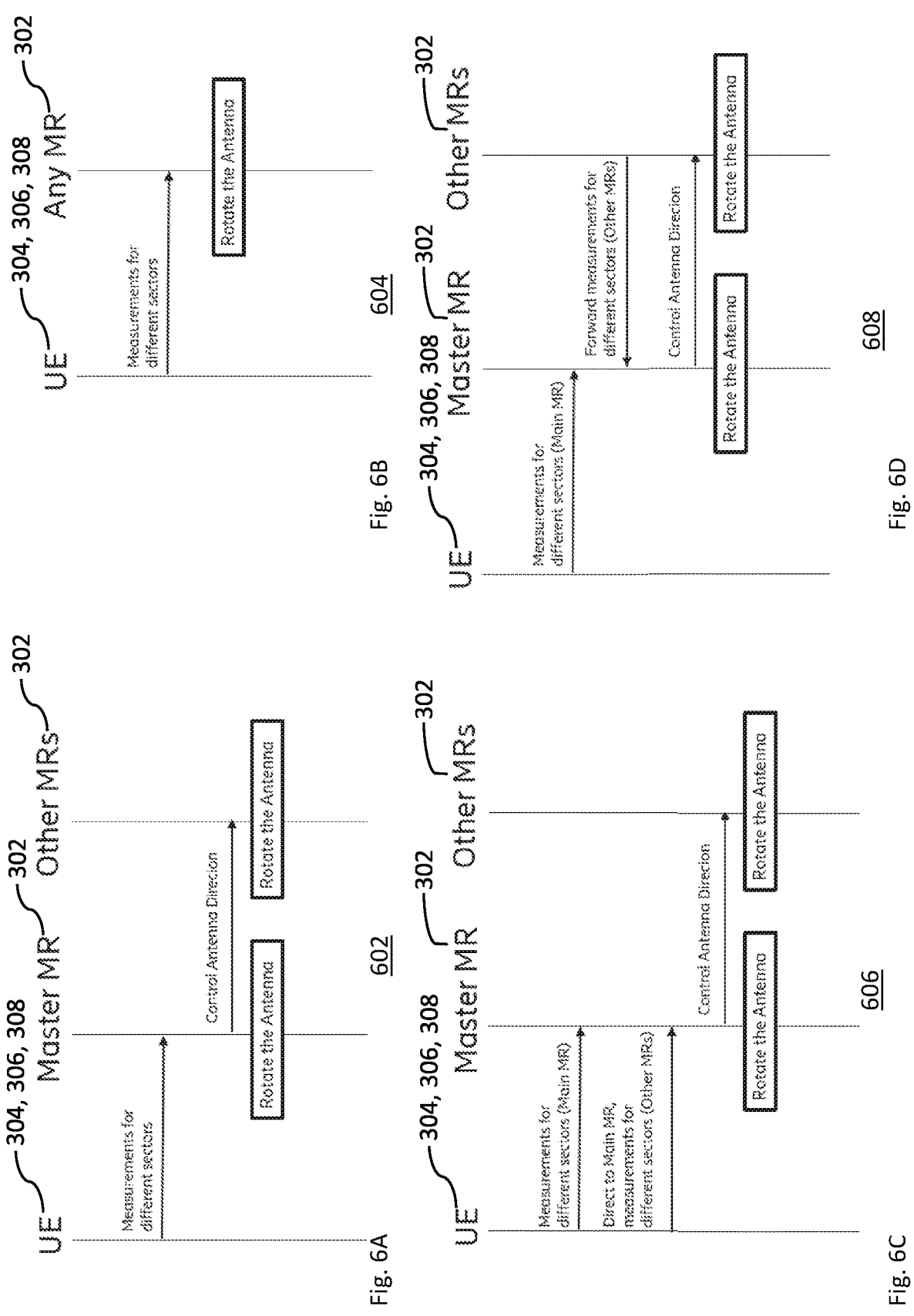
FIGS. 6A to 6D show signaling diagrams resulting from embodiments of the device 100 of FIG. 1 in communication with each other and/or in communication with a first radio device.

FIG. 6A schematically illustrates a signaling diagram for a first implementation of the control signaling.

The first radio device 304 transmits reports indicative of the signal strengths. The reports are received at the Master MR 302 according to the step 202. The Master MR 302 further performs the step 204 of computing the first azimuthal directions for the respective antennas and transmits a control message to the one or more other MRs 302. The control message is indicative of a change of the first azimuthal directions computed for the respective antennas mounted on the other MRs 302. Each of the MRs 302 performs the step 206 according to the first azimuthal direction computed for the respective antenna.

FIG. 6B schematically illustrates a signaling diagram for a second implementation of the control signaling.

The first radio device 304 transmits reports indicative of the signal strengths. The reports are received at each of the MRs 302 according to the step 202. Each of the MRs 302 further performs the step 204 of computing the first azimuthal direction for the respective one of the antennas. Each of the MRs 302 performs the step 206 according to the first azimuthal direction computed for the respective antenna.

FIG. 6C schematically illustrates a signaling diagram for a third implementation of the control signaling.

The first radio device 304 transmits a report that is indicative of the signal strengths for the multiple sectors 402 of the antenna of the Master MR 302. The report is received at the Master MR 302 according to the step 202. The Master MR 302 further performs the steps 204 and 206 based on the received report. The first radio device 304 further transmits a further report for each of the other MRs 302, which is indicative of the signal strengths for the multiple sectors 402 of each of the antennas of the other MRs 302. The further reports are received at the Master MR 302. The Master MR 302 computes the first azimuthal directions for each of the other MRs 302 and transmits control messages indicative of a change of the first azimuthal directions computed for the respective antennas mounted on the respective one of the other MRs 302. Each of the MRs 302 performs the step 206 according to the first azimuthal direction computed for the respective antenna. Preferably, the control messages are transmitted before the Master MR 302 performs the step 206. For example, all of the MRs 302 in the RAN and/or providing radio access to the first radio device 304 perform the step 206 simultaneously.

FIG. 6D schematically illustrates a signaling diagram for a fourth implementation of the control signaling.

The first radio device 304 transmits a report that is indicative of the signal strengths for the multiple sectors 402 of the antenna of the Master MR 302. The report is received at the Master MR 302 according to the step 202. The Master MR 302 further performs the steps 204 and 206 based on the received report. The first radio device 304 further transmits a further report for each of the other MRs 302, which is indicative of the signal strengths for the multiple sectors 402 of each of the antennas of the other MRs 302. The further reports are received at the respective one of the other MRs 302. Each of the other MRs 302 forwards the measured signal strengths to the Master MR 302, which computes the first azimuthal directions for each of the other MRs 302 and transmits a control message indicative of a change of the first azimuthal directions computed for the respective antennas mounted on the other MRs 302. Each of the MRs 302 performs the step 206 according to the first azimuthal direction computed for the respective antenna. Preferably, the control messages are transmitted before the Master MR 302 performs the step 206. For example, all of the MRs 302 in the RAN and/or providing radio access to the first radio device 304 perform the step 206 simultaneously.

While the control signaling has been described for the first radio device 304 (e.g., the ViP UE), such a control signaling may also be performed in relation with one or more second radio devices 306 and/or 308, e.g. to determine with of the second sectors provides radio access to the one or more second radio devices 306 and/or 308.

Alternative or in addition, any implementation of the method 200 may implement the step 204 of computing by a linear interpolation of the determined signal strengths.

For example, the aircraft 302 computes according to the step 204 control angles (also: azimuthal angles) representing changes in the azimuthal direction:

deltaAngleLeft=RSRPtoAngleFactor·changeOfRSRPFront+
    changeOfRSRPLeft/2 and deltaAngleRight=RSRPtoAngleFactor·changeOfRSRPFront+
    changeOfRSRPRight/2.

The azimuthal angle deltaAngleLeft is the input signal for the follow-up system of the multi-sector antenna on the left sector (which value may negative, e.g., by including a negative sign in the factor RSRPtoAngleFactor for deltaAngleLeft) performing the step 206. The azimuthal angle deltaAngleRight is the input signal for the follow-up system of the multi-sector antenna on the right sector (e.g., which value is positive) performing the step 206.

RSRPtoAngleFactor is a predefined or configurable factor of proportion between the change of the RSRP and the change of the azimuthal angle. Based on the signal strengths determined in the step 202, changeOfRSRPFront is the change of the RSRP on the first sector 402' (e.g., the front sector), changeOfRSRPLeft is the change of the RSRP on the left sector, and changeOfRSRPRight is the change of RSRP on the right sector.

The first azimuthal direction computed in the step 206 may be a superposition of the decision or results for the first sector 402'. For example, the change of the first azimuthal direction performed in the step 206 of rotating the antenna may correspond to the sum of the azimuthal angles deltaAngleRight and deltaAngleLeft. Alternatively, the azimuthal angle deltaAngleRight or deltaAngleLeft, which is greater in magnitude, may be applied in the step 206.

Optionally, the method 200 may comprise repeating the step of determining the signal strengths and computing the control angles deltaAngleLeft and/or deltaAngleRight. The computed first azimuthal direction may correspond to the sum of the control angles.

The above computation may be applied in combination with any implementation of the control signaling. For example, the Master MR 302 can also receive and/or forward the measurements from and/or to the other MRs 302. Alternatively, the Master MR 302 may be informed (e.g., by the first radio device 304 or the other MRs 302) of the signal strengths measured for the sectors of antennas mounted on the other MRs 302.

For example, changes (e.g., corrections or "deltas") calculated based on measurements in the computing step may be transmitted in a control signal "Control Antenna Direction" (e.g., as input for an ANN 800) according to FIGS. 6A and 6C and 6D. In the implementation according to FIG. 6D, real values may be transmitted together with measurements (e.g., with a separate training of an ANN 800).

In computing the respective first azimuthal directions for the first sector 402' of the antenna mounted on the respective one of the other MRs 302, the respective first azimuthal directions may be computed based on a superposition of the decision or results for the respective first sector 402'.

Figure 7A:
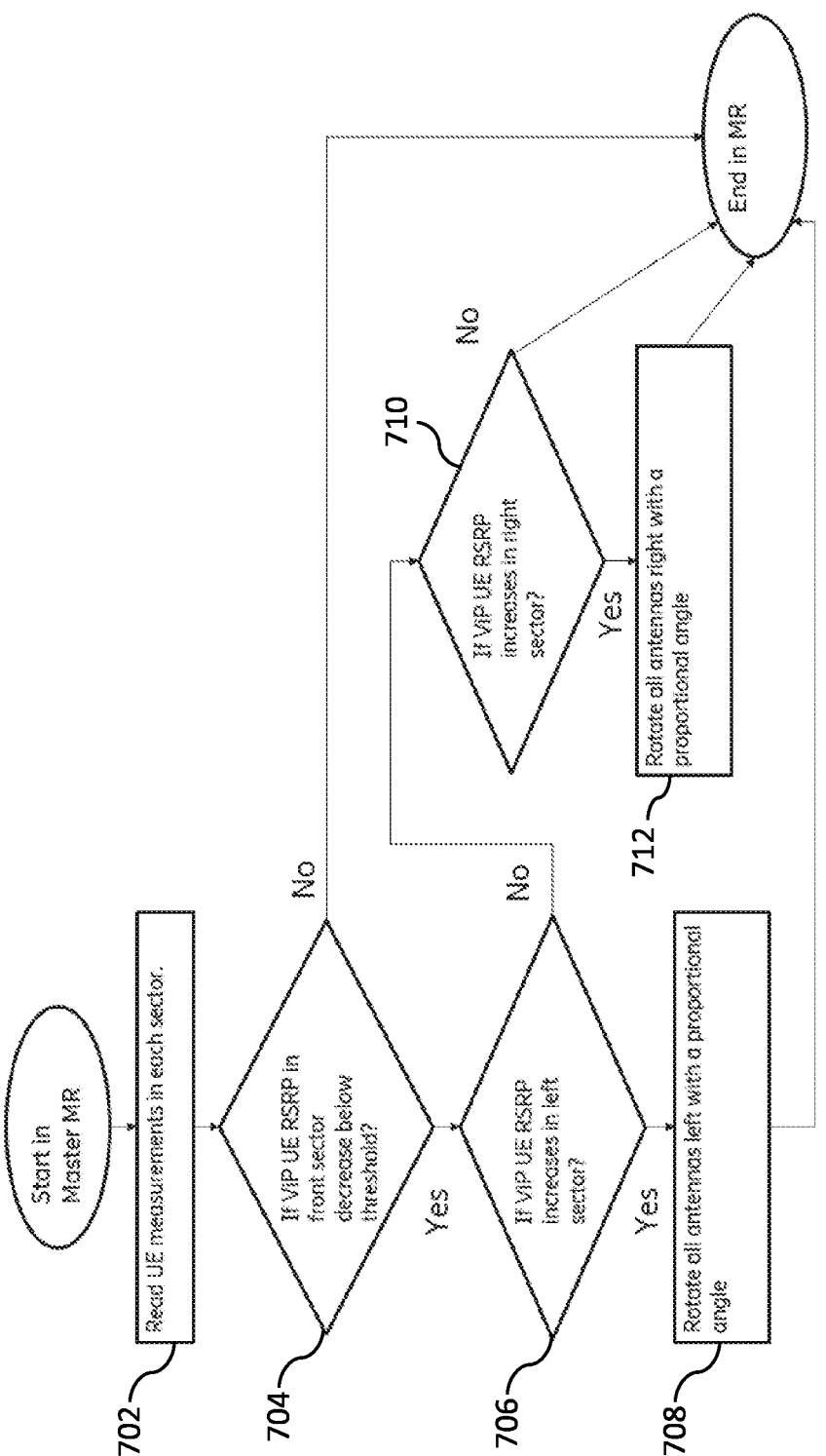
FIG. 7A shows a schematic flowchart for implementing the method of FIG. 2.

FIG. 7A shows a schematic flow chart for an implementation of the method 200, which may be combined with any of the implementations and embodiments disclosed herein. Particularly, the method 200 may be implemented as an antenna direction decision in the Master MR 302 (e.g., flying RBS or drone) with autonomous antenna control of the multi-sector antenna.

The step 202 of determining the signal strengths may be implemented in a step 702 of reading measurements of the signal strengths received from the first UE 304 for each sector 402 of the multi-sector antenna.

The steps 204 may further require that the signal strength of the first sector 402' decreases below a (e.g., predefined or configured) threshold, e.g., according to a branching point 704 of the method 200.

The superposition of the decision or results may be implemented by applying the deltaAngleLeft in the step 206, if (e.g., only if) the signal strength increases in the second sector 402 to the left of the first sector 402' according to the branching point 706 of the method 200. Alternatively and/or in addition, the superposition of the decision or results may be implemented by applying the deltaAngleRight in the step 206, if (e.g., only if) the signal strength increases in the second sector 402 to the right of the first sector 402' according to the branching point 710 of the method 200.

The steps 708 and 712 may be examples of the method step 206.

In any implementation including the Master MR 302 transmitting the control message to the one or more other MRs 302 (e.g., the antenna direction decision in the Master MR 302), the first azimuthal direction computed for the respective one of the other MRs 302 may be based on an aggregated change of the azimuthal angle.

Alternatively or in addition, any implementation including the Master MR 302 transmitting the control message to the one or more other MRs 302 may be implemented according to any one of FIG. 6A, 6C or 6D. The step "Rotate the Antenna" performed by any one of the other MRs 302 may be triggered by the control message "Control Antenna Direction" (i.e., as an example of the control message). The control message may be indicative of at least one of the angles, the deltas, and the scores.

Alternatively or in addition, the computation 204 may include evaluating an Artificial Neural Network (ANN) 800. For example, any of the above calculations for following the signal quality may use the ANN 800 or may be overridden by the ANN.

For example, any implementation including the Master MR 302 transmitting the control message to the one or more other MRs 302 may execute running of an ANN 800 for calculation of the control angles (i.e., changes or "deltas" of the first azimuthal direction) for the MR 302 running the ANN 800 based on aggregated data from the whole network of MRs 302 (e.g., the RAN of MRs 302), e.g., as described below with reference to FIG. 7B.

Figure 7B:
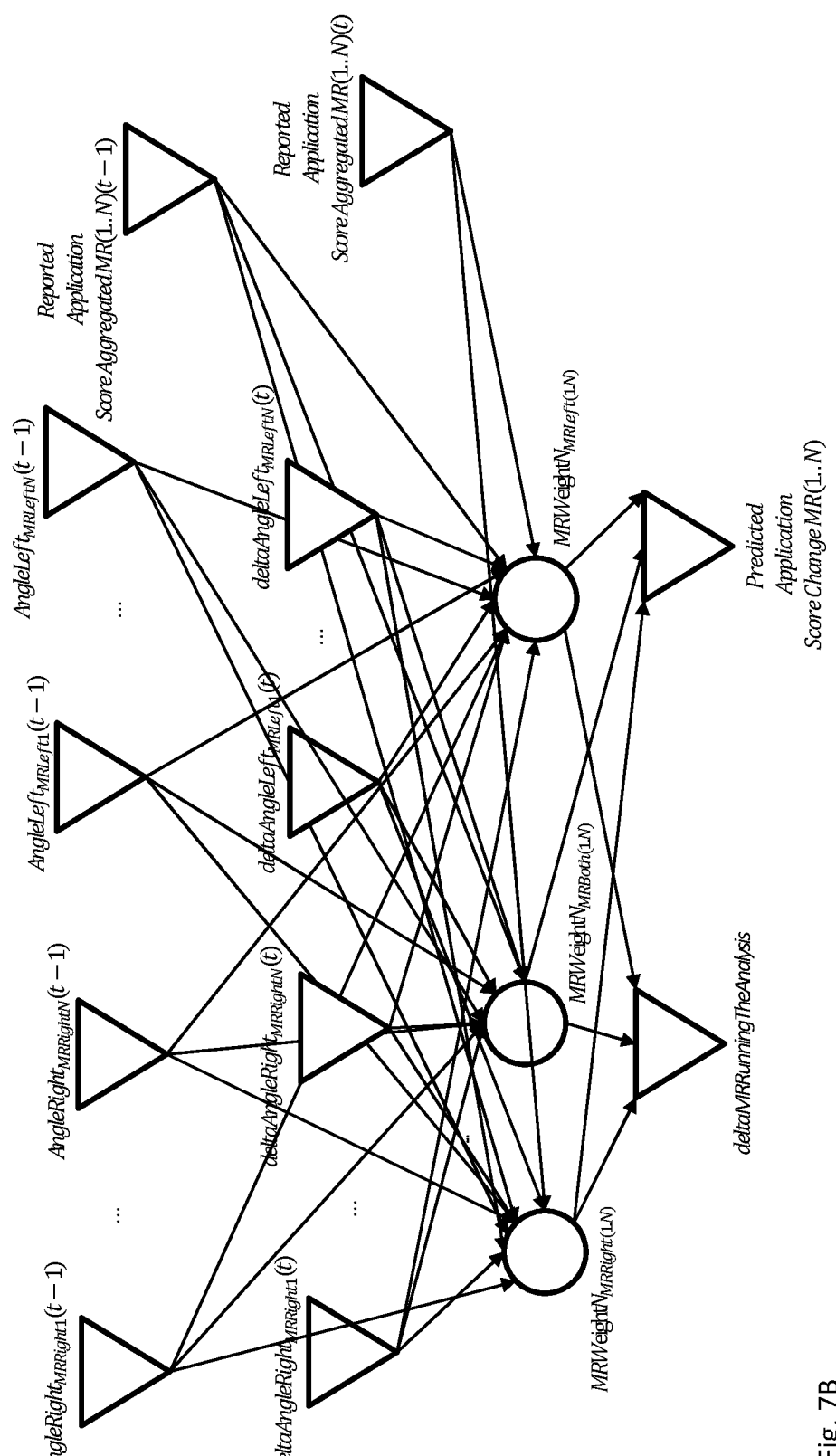
FIG. 7B schematically illustrate an embodiment of an artificial neural network for implementing a computation module of the device of FIG. 1.

FIG. 7B schematically illustrates a first embodiment of the ANN 800 for the computation 204. The ANN 800 comprises an input layer to which the past or current first azimuthal directions (e.g., AngleRight$_{MRRighti}$(t−1) and AngleLeft$_{MRLefti}$(t−1)) of the MRs 302 (i.e., the first azimuthal directions of the i-th MR 302 for i=1 to N) are applied. The ANN 800 further comprises an input layer to which the current changes of the first azimuthal directions (e.g., deltaAngleRight$_{MRRighti}$(t) and deltaAngleLeft$_{MRLefti}$(t)) of the MRs 302 (i.e., the control angles or changes of the first azimuthal directions of the i-th MR 302 for i=1 to N) are applied.

In the drawing of FIG. 7B, the number of MRs 302 in the RAN is N (e.g., as opposed to the number of sectors per multi-sector antenna). For example, the current azimuthal direction of the i-th MR 302 may be represented by a positive value of the azimuthal angle AngleRight$_{NRRighti}$(t−1) while AngleLeft$_{NRLefti}$(t−1) is equal to zero or the current azimuthal direction of the i-th MR 302 may be represented by an absolute value of the (negative) azimuthal angle AngleLeft$_{NRLefti}$(t−1) while AngleRight$_{NRRighti}$(t−1) is equal to zero.

For example, the values of the azimuthal angles representing the first azimuthal directions of the antennas are deviations of the azimuthal direction relative to or from a geographical cardinal direction or azimuths (e.g., from a past time frame at time t−1), "deltas" of the first azimuthal directions are the control angles or changes of the first azimuthal directions used in the current time frame (e.g., at time t).

Optionally, an aggregated application score (e.g., from a chosen application) from a previous time frame and/or from a current time frame are applied to the input layer of the ANN 800. The aggregated application score is also referred to as "AggregatedApplicationScore" hereinbelow and as "Reported Application ScoreAggregatedMR(1 . . . . N)(t)" in FIG. 7B.

The aggregated application score may be implemented in accordance with $$AggregatedApplicationScore = \sum_{i=1}^{N} ApplicationScore\_{UE_{ViP_i}}$$

wherein AggregatedApplicationScore is a superposition of ApplicationScore reported for a set of MRs (e.g., i=1, . . . , N) from the first radio device 304 (e.g., the ViP UE) for a chosen application.

Alternatively or in addition, the aggregated application score may be implemented in accordance with $$AggregatedApplicationScore = \sum_{i=1}^{N} \sum_{App=1}^{A} ApplicationScore_{UE_{ViP_{i,App}}}$$

wherein AggregatedApplicationScore is a superposition of an ApplicationScore reported from the first radio device 304 (e.g., the ViP UE) for a set of A applications and for a set of MRs (e.g., i=1, . . . , N).

Alternatively or in addition, the aggregated application score may be implemented in accordance with $$AggregatedApplicationScore = \sum_{UE=1}^{U} \sum_{i=1}^{N} ApplicationScore_{UE,i}$$

wherein AggregatedApplicationScore is a superposition of ApplicationScore reported from set of radio devices (e.g., UE=1, . . . , U) for a set of MRs (e.g., i=1, . . . , N) for a chosen application.

Alternatively or in addition, the aggregated application score may be implemented in accordance with $$AggregatedApplicationScore = \sum_{UE=1}^{U} \sum_{i=1}^{N} \sum_{App=1}^{A} ApplicationScore_{UE,i,App}$$

wherein AggregatedApplicationScore is a superposition of ApplicationScore reported from set of radio devices (e.g., UE=1, . . . , U) and for a set of MRs (e.g., i=1, . . . , N) and for a set of applications (e.g., App=1, . . . , A).

The ANN 800 outputs a predicted change of the application score, which is also referred to as predicted application score change hereinbelow or "Predicted ApplicationScore Change M (1 . . . . N)" in FIG. 7B. The predicted application score change is a predicted change in the application score, which will be reported by the first radio device 304 (e.g., the ViP UE) for a chosen application after applying control angles to the MRs (i.e., the swarm of devices 100).

Optionally, the output layer of the ANN 800 further outputs deltaMRRunningTheAnalysis, which is a change of the signal strength for the first sector 402' of the antenna of the aircraft 302 (e.g., the master MR) running the ANN 800.

The ANN 800 may be trained with a model of the azimuthal angle for the rotation 206 of the multi-sector antenna for improving signal measurements compared to a current antenna angle, optionally including further input of flight telematics and/or weather conditions. Alternatively or in addition, the ANN may be trained based on recorded (also referred to as "historical") data from MRs 302, e.g., performing any one of the above calculations. Any training of the ANN may use any of the learning algorithms known in the field of machine learning. For example, the learning algorithm may solve Markov's equation for the set of data used, e.g. backward signal propagation with enhancements.

FIG. 8A shows schematically a second embodiment of the ANN 800, which may be combined with or which may extend the first embodiment of the ANN 800. The ANN comprises an input layer, one or more intermediate layers and an output layer. A current azimuthal antenna angle (e.g., a current first azimuthal direction) and the determined signal strengths (i.e., signal measurements) is applied to the input layer. Optionally, at least one of flight cinematics and weather conditions is further applied to the input layer.

The output layer provides the azimuthal angle for the rotation 206, i.e., the change (or "delta") for the angle of the antenna.

By performing the method 200, the RAN may be a Self-Organizing Network (SON).

Any embodiment of the device 100 and any implementation of the method 200 may further comprise an ANN 800 for determining the best MR 302 in the RAN.

FIG. 8B schematically illustrates a third embodiment of the ANN 800, which may be combined with or which may extend the first and/or second embodiment of the ANN 800. For each of the MRs 302 in the RAN, a measured QoS and/or a feedback from an application (e.g., performed by the first radio device 304) is applied to the input layer of the ANN 800. The output layer of the ANN 800 is indicative of an identifier of the MR 302 to be used (e.g. as the Master MR 302) for the application and/or for providing radio access to the first radio device 304.

FIG. 8C shows schematically a fourth embodiment of the ANN 800, which may be combined with or which may extend the first and/or second and/or third embodiment of the ANN 800. The ANN 800 may be evaluated in the step 204 for a certain application, for evaluation the azimuthal angle for the rotation 206 antenna (i.e., the delta angle) and/or for a prediction of a best application score of the application.

At least one of a recorded sequence of the azimuthal antenna angle (e.g., a recorded sequence of the first azimuthal direction) and a recorded sequence of the determined signal strengths (i.e., signal measurements) is applied to the input layer. Optionally, at least one of a recorded sequence of flight cinematics, a recorded sequence of measured QoS indicators and a recorded sequence of weather conditions is further applied to the input layer.

The output layer of the ANN 800 may be indicative of the azimuthal angle for the (e.g., next or future) rotation 206 and/or a predicted score from the application.

Furthermore, any two, three or four of the above embodiments of the ANN 800 may be implemented in combination, e.g., by a single ANN 800.

A configuration of radio resources in the frequency domain (e.g., a radio spectrum) used by the MRs 302 for providing the radio access to the radio devices 304, 306 and/or 308 may be determined by means of a genetic algorithms, e.g., in combination with any of the aforementioned embodiments (e.g., embodiments of the ANN 800).

For example, a DNA key (e.g., a chromosome representation) may comprise (e.g., for frequency-division duplex or FDD) at least one of an identifier (ID) of a secondary cell (sCell) in the downlink (DL), which is also referred to as DL sCell ID. For the radio signals and/or for providing the radio access, each DL sCell ID may be assigned with at least one of a frequency, a bandwidth, a Physical Cell Identity (PCI) and a random sequence.

Alternatively or in addition, the DNA key may comprise (e.g., for FDD) an identifier (ID) of a secondary cell (sCell) in the uplink (UL), which is also referred to as UL sCell ID. For the radio signals and/or for providing the radio access, each UL sCell ID may be assigned with at least one of a frequency, a bandwidth, a Physical Cell Identity (PCI) and a random access preamble (RAP, also: random access sequence).

Alternatively or in addition, the DNA key (e.g., for FDD) may be bound towards, or paired with, any one of the applications. Therefore, the DNA key may also be referred to as a "pair".

The MRs 302 may be configured to serve sets of applications, which comprise a DL sCell and/or an UL sCell that are paired or bound with the respective application.

Figure 9:
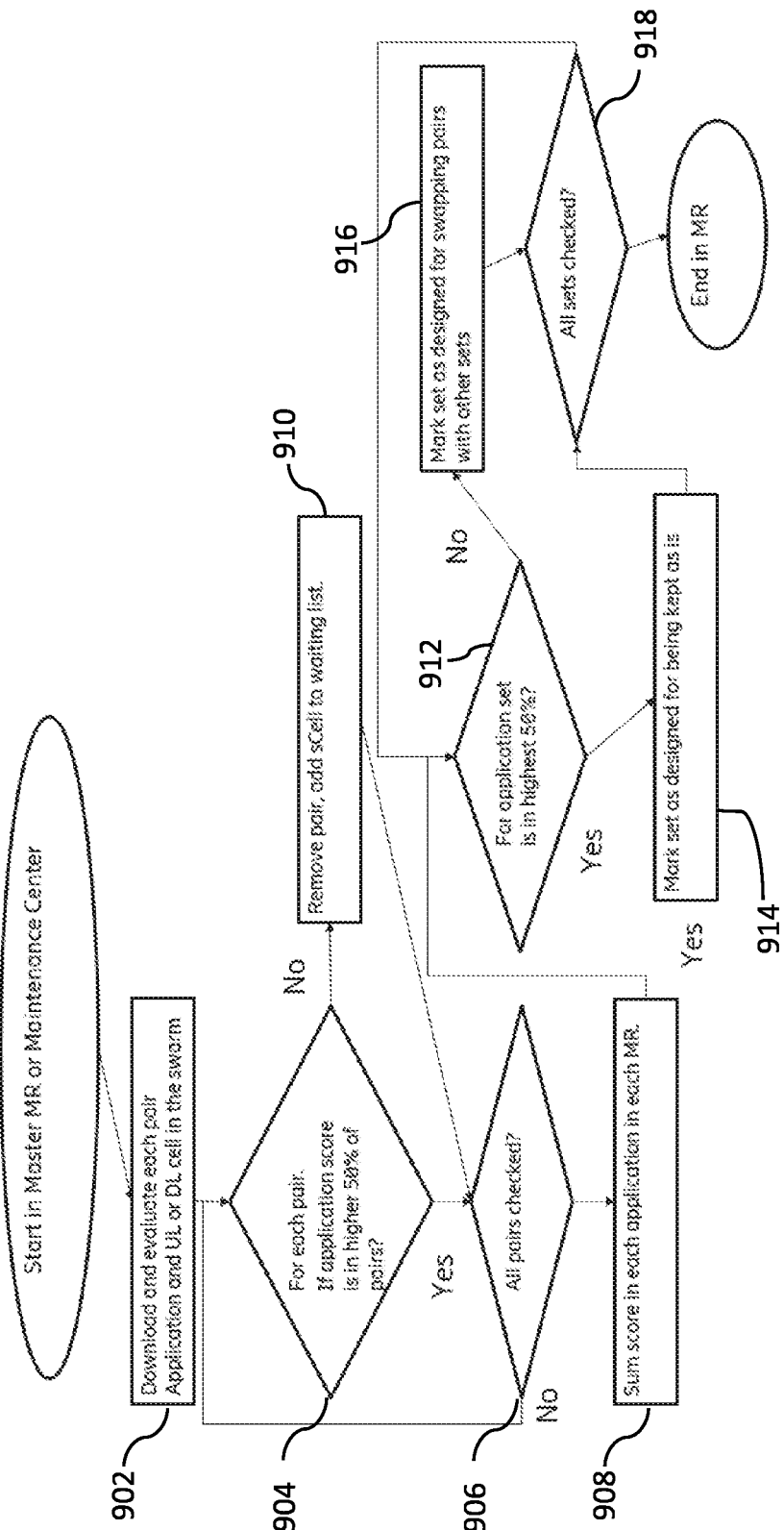
FIG. 9 shows a schematic flowchart for an embodiment of a maintenance process for classifying sets and pairs according to score.

FIG. 9 discloses a maintenance process for classifying application sets and one or more pairs in the application set according to a score from the respective application.

Figure 10:
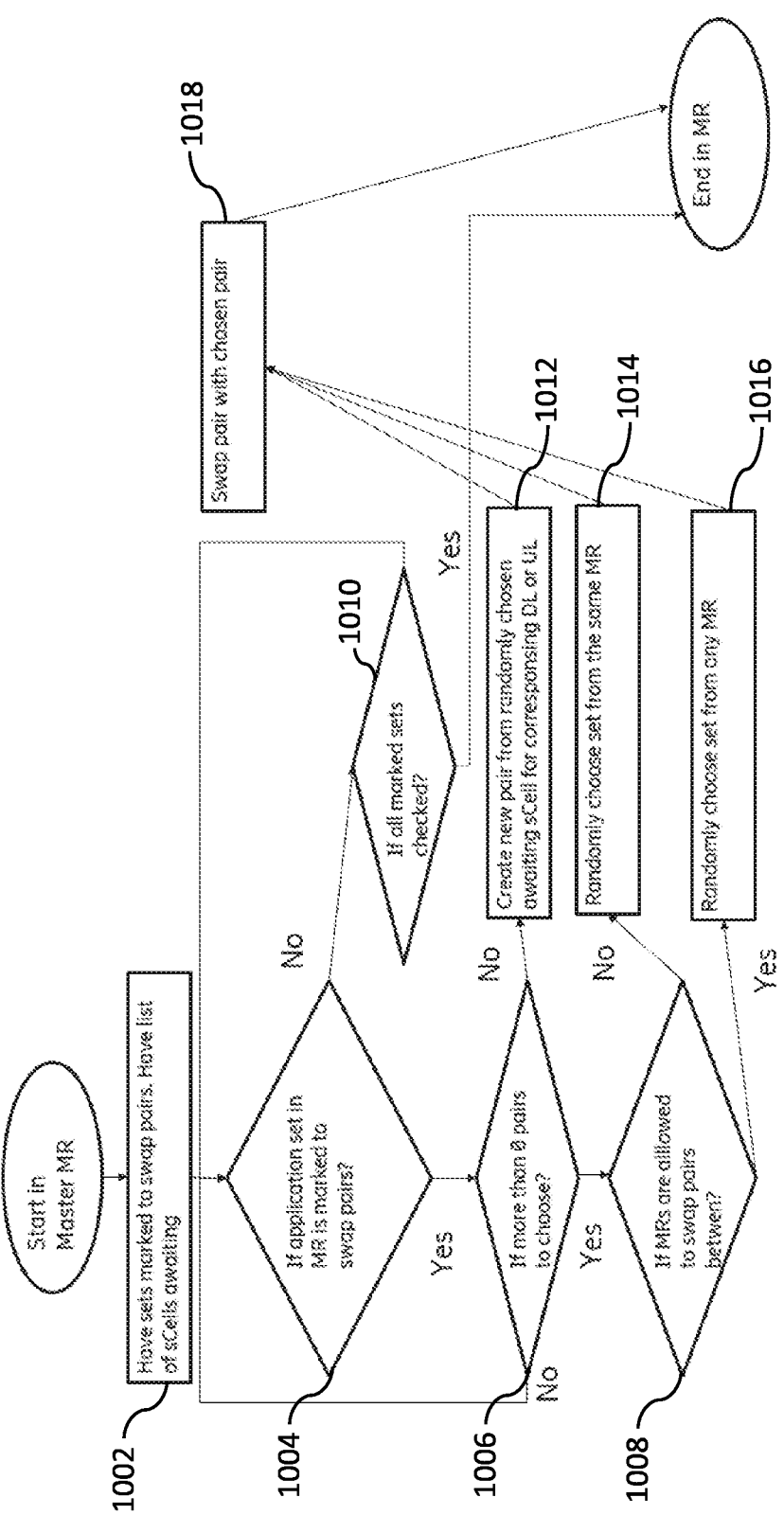
FIG. 10 shows a schematic flowchart for an embodiment of a maintenance process for swapping the pairs.

FIG. 10 discloses a maintenance process for selecting pairs to be swapped and swapping the pairs. The maintenance process for selecting and swapping may be implemented based on the maintenance process for classifying or may be implemented independently of the classifying.

Figure 11:
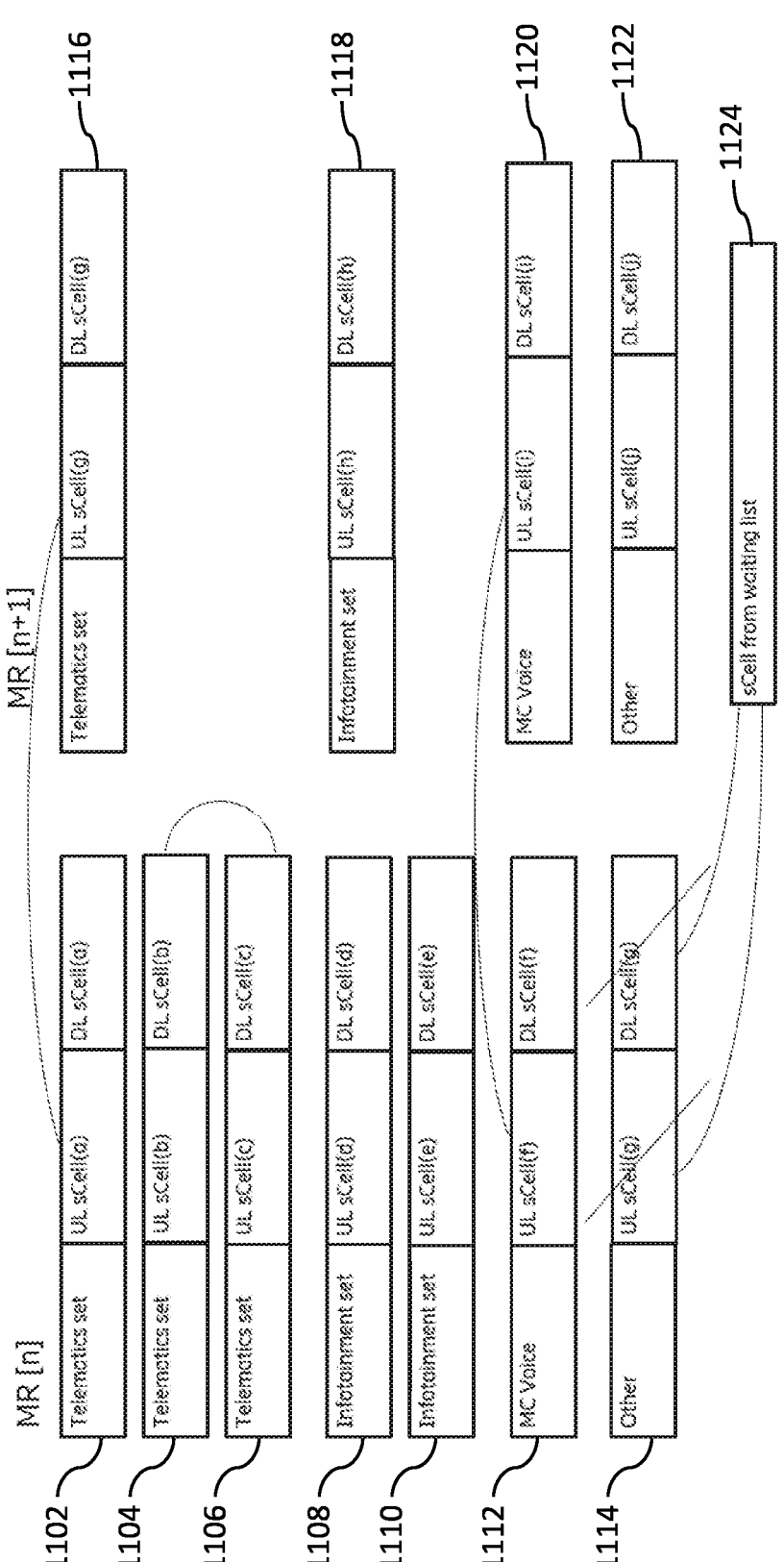
FIG. 11 schematically illustrates an example of the sets of pairs.

FIG. 11 schematically illustrates examples of sets of applications with UL and DL sCells for at least two devices 100 embodied by respective two aircrafts 302. The respective application is indicated in the left box of each pair 1102 to 1122.

Each of the (e.g., UL and DL) sCell receive a score from the application.

Pairs 1102 to 1122 for which the feedback of the respective application is indicative of a score below a threshold value or below a certain percentile (e.g., the median) of the scores of all pairs are considered poor pairs. The poor pairs are deleted in a maintenance process. The (e.g., UL and DL) sCells that had been bound to deleted pairs are added to a list 1124 of unused spectrum (i.e., unused radio resources in the frequency domain).

The method 200 performed by any one of the MRs 302, preferably the method 200 performed by the Master MR 302, and/or another method performed by the maintenance center 310 may comprise at least one of the following maintenance steps for maintaining the pairs according to the maintenance process.

In the maintenance process for classifying, in a maintenance step 902, each pair 1102 to 1122 is downloaded from the respective one of the MRs 302.

A maintenance step 904 checks whether the associated score is below or above the median of all scores. If the pair is below in the step 904, the pair is deleted and the associated one or more sCells are added to the list 1124 in a maintenance step 910.

If the pair is above in the step 904 or after the step 910, a maintenance step 906 checks if all pairs 1102 to 1122 have been assessed.

Each set of pairs for any one of the applications (also referred to as application set) has its aggregated score. A maintenance step 908 computes the aggregated score as the sum of all scores for each application and for each of the MRs 302 of the RAN.

In the example illustrated in FIG. 11, the application set for the application "Telematics" comprises three pairs 1102 to 1106, the application set for the application "Infotainment" comprises two pairs 1108 and 1110, the application set for the application Mission Critical Voice (or "MC Voice", e.g., a radio telephone or radio transceiver) comprises one pair 1112, and another application comprises one pair 1114.

Optionally, a maintenance step 912 checks whether the aggregated score of the application set is below or above a percentile (e.g., the median). If the aggregated score of the application set is above, a maintenance step 914 marks the application set for being kept unchanged. Otherwise, a maintenance step 916 marks the application set for swapping one or more pairs in the application set with one or more pairs in another application set.

The lines between the pairs in FIG. 11 illustrate the swapping or creating of new sets and pairs of applications and sCells.

By way of example, periodically (e.g., every 15 seconds), the two best sets of pair remain unchanged. Two worse sets of pairs are removing two worse pairs and swap between two best pairs between each set of pairs (i.e. a crossing over). The crossing over could be configured to allow swaps between different MRs 302 or not (i.e., only swapping within the radio resources of one MR 302).

Optionally, for time-division duplex (TDD) UL and DL sCells are regarded as the same cell with certain frequency and bandwidth.

As one example schematically illustrated in FIG. 11, the frequencies "a" (i.e. "sCells(a)") of the pair 1102 are poor for the MR [n] and the frequencies "g" (i.e. "sCells(g)") of the pair 1116 are poor for the MR [n+1]. Consequently, the sCells are swapped between the different MRs 302.

As another example schematically illustrated in FIG. 11, the frequencies "b" (i.e. "sCells(b)") of the pair 1104 and the frequencies "c" (i.e. "sCells(c)") of the pair 1106 for the MR [n+1] are swapped within the MRs 302.

As another example, the frequencies "g" of the pair 1114 are released by adding them to the list 1124 when the pair 1114 is deleted.

While FIG. 9 discloses a maintenance process for classifying sets and pairs according to score from the respective application, FIG. 10 discloses a maintenance process for selecting pairs to be swapped in set of sCells for an application in the MR 302 or between MRs 302.

In the maintenance process for selecting, in a maintenance step 1002, a list of sets marked for swapping pairs and the list 1124 of unused sCells is available or defined (e.g., provided to the Master MR 302).

A maintenance step 1004 checks whether the application set in the MR 302 is marked for swapping pairs or not. If the application set is marked for swapping pairs, a maintenance step 1006 further checks whether at least one pair is available to be chosen or not.

If at least one pair is available to be chosen (e.g., from a poor pair), a maintenance step 1008 further checks whether different MRs are allowed to swap pairs or not. If allowed, an application set is randomly chosen in a maintenance step 1016 from any other MR 302. If not allowed, an application set is randomly chosen in a maintenance step 1014 from the same MR 302.

If the maintenance step 1004 yields that the application set is not marked for swapping pairs, the maintenance process for selecting may continue with the maintenance step 1006 if all marked sets have been checked according to the maintenance step 1010. Otherwise, the maintenance process for selecting may terminate according to the maintenance step 1010.

If the maintenance step 1006 yields that no pair is available to be chosen (e.g., there is no poor pair), a new pair is created from randomly choosing an sCell from the list 1124 of available sCells in a maintenance step 1012.

Based on the pairs chosen or created in the maintenance steps 1012, 1014 or 1016, a maintenance step 1018 may swap the used pair with the chosen or created pair.

The maintenance process for the swapping is repeated until all sets marked for swapping have been processed according to the maintenance steps 1006 to 1018.

Figure 12A:
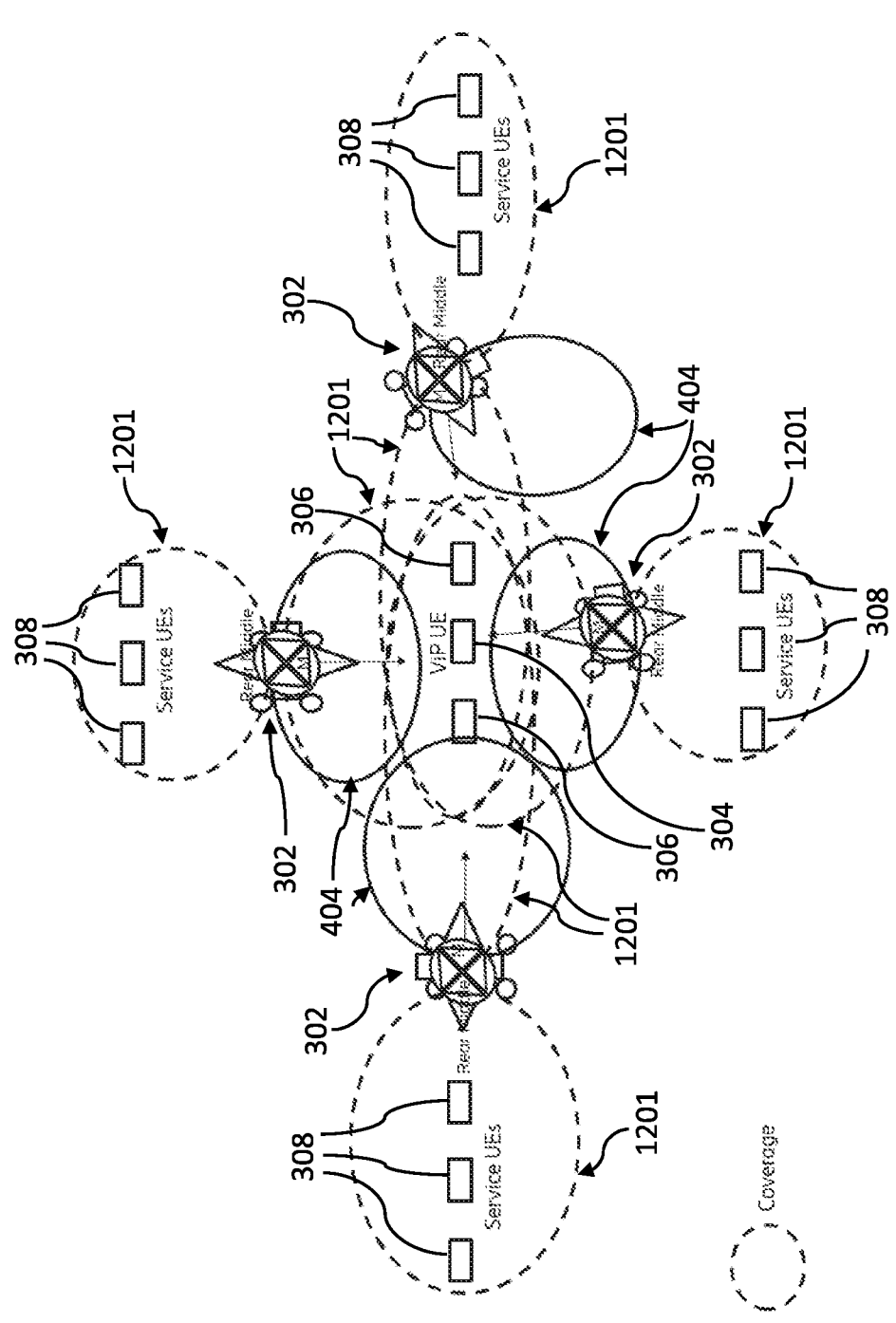
FIG. 12A shows schematically a first embodiment of the RAN comprising a plurality of aircrafts each embodying the device of FIG. 1.

FIG. 12A shows schematically a first embodiment of the RAN comprising a plurality of aircrafts 302 each embodying the device 100 for providing coverage 1201 to service vehicles embodying the radio devices 304, 306 and 308, e.g., in convoys. The coverage 1201 may be on the sides (e.g., provided by means of a second and fourth sector 402 of the multi-sector antenna) and/or before (e.g., provided by means of the first sector 402' of the multi-sector antenna) and/or after (e.g., provided by means of a third sector 402 of the multi-sector antenna) the aircrafts 302.

In the first embodiment of the RAN, each of the aircrafts 302 may be moving in a predictable way 404, e.g., as being part of the same convoy. For example, each of the aircrafts 302 may move on a closed trajectory 404. The closed trajectories 404 may be arranged circumferentially around the convoy comprising the first radio device 304.

In a first scenario of the first embodiment of the RAN, multiple drones 302 are providing radio access (i.e., network access) to the first radio device 304 (e.g., the ViP UE). Coordinated Multi-Point (COMP) transmission and/or reception of the RAN may be used to provide an uplink (UL) and/or a downlink (DL) connection for usual data, e.g., continuously measuring the latency of packets. In case when a latency-sensitive application shall be used, e.g. MC voice or gaming, the aircraft 302 (i.e., the corresponding device 100 and/or the corresponding multi-sector antenna and/or the corresponding sector) with measured lowest latency can be chosen (e.g., rotated 206) to provide the radio access for the latency-sensitive application, e.g., to be involved in the COMP transmission and/or reception.

In a second scenario of the first embodiment of the RAN, each drone represents a RAN edge of different networks. Different services may be bound to each of the different networks. The second scenario of the first embodiment of the RAN may be combined with the first scenario.

By way of example, a first aircraft 302 (e.g. a first drone) may serve telematics, e.g., for car automation. The first aircraft 302 may handle up to 255 car controllers. Alternatively or in addition, a second aircraft 302 (e.g. a second drone) may serve infotainment, e.g., at least one of Video on Demand (VOD), interactive virtual education, music, podcasts, and gaming. Alternatively or in addition, a third aircraft 302 (e.g. a third drone) may serve Mission Critical Voice (MC Voice). Alternatively or in addition, a fourth aircraft 302 (e.g. a fourth drone) may be redundant in the RAN to take the task of any of the other aircrafts 302 in case of QoS loss or failure.

Alternatively or in addition, a first one of the aircrafts 302 (e.g., the Master MR) may perform a method of attaching (or associating) one of the aircrafts 302 (e.g., the Master MR or the Slave MR) to one or each of the radio devices (preferably to the first radio device).

Figure 12B:
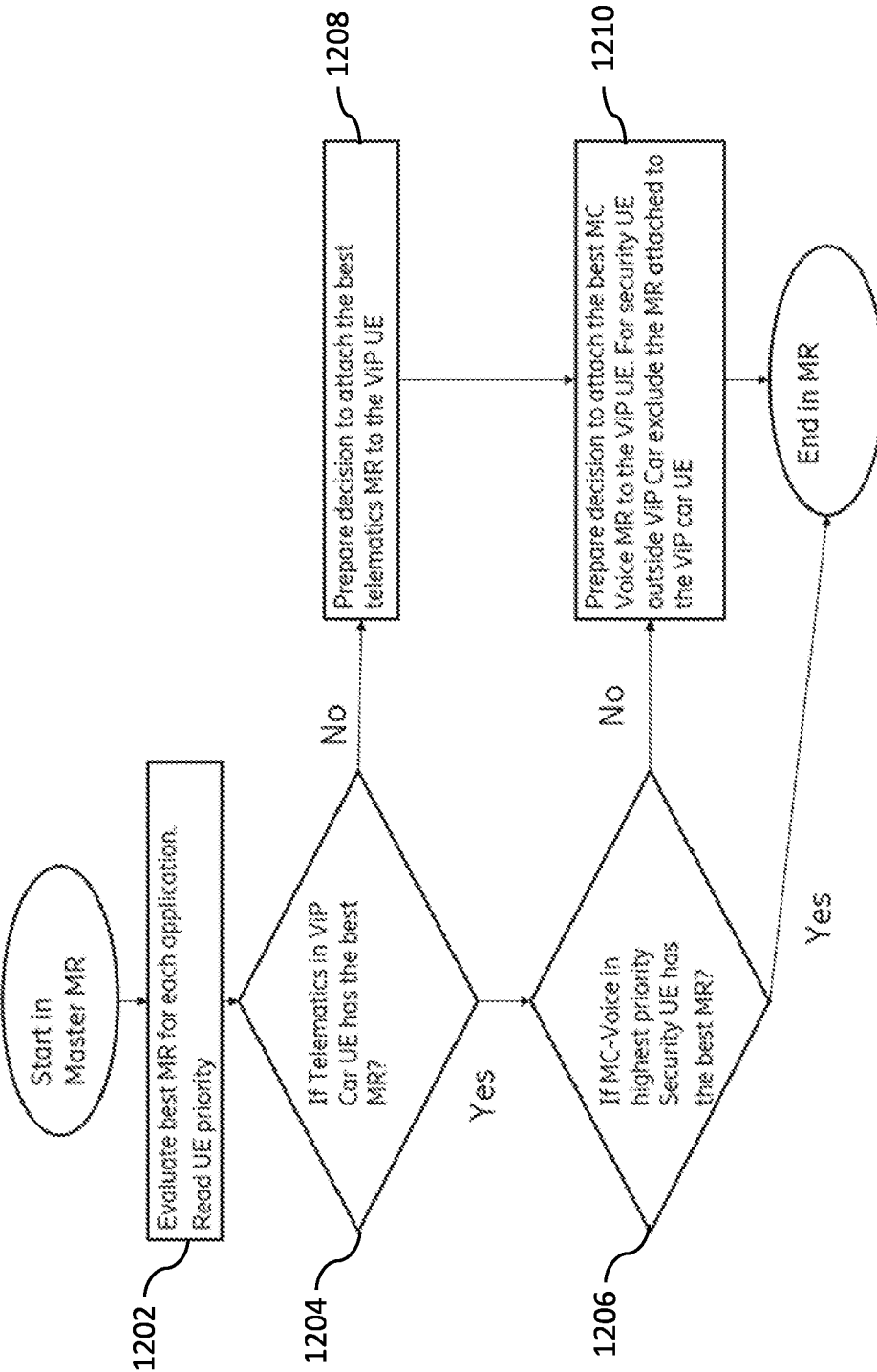
FIG. 12B shows a flowchart of an embodiment of a method of attaching at least one aircraft of FIG. 12A.

FIG. 12B shows a flowchart of an embodiment of a method of attaching at least one aircraft 302 among the unmanned aircrafts 302 for a given radio device, preferably the first radio device (e.g., the ViP UE or a ViP car). In a step 1202, the first aircraft 302 receives a priority (e.g., a type of application) from the first radio device 304 and evaluates, which of the unmanned aircrafts 302 is configured to fulfill the priority (e.g., a QoS required for the application, preferably in terms of latency, and/or reliability, and/or data throughput, and/or reliability). For example, the aircraft 302 that is configured to provide the best performance relevant for the application in terms of latency, and/or reliability, and/or data throughput, and/or reliability (i.e., the most suitable or "best" aircraft 302) is attached to the first radio device 304.

Optionally, a branching point 1204 assesses whether telematics as a first application in the first radio device 304 has the aircraft 302, which is most suitable for the first application, attached to the first radio device or not. If not, a step 1208 triggers attaching the aircraft 302 most suited for telematics to the first radio device 304. Alternatively or in addition, a branching point 1206 assesses whether MC voice as a second application in a second radio device 306 and/or 308 (e.g., a security UE or service UE) has the aircraft 302, which is most suitable for the first application, attached to the second radio device 306 and/or 308 or not. If not, a step 1210 triggers attaching the aircraft 302, which is most suited for MC voice, to the second radio device 306 and/or 308.

Figure 13:
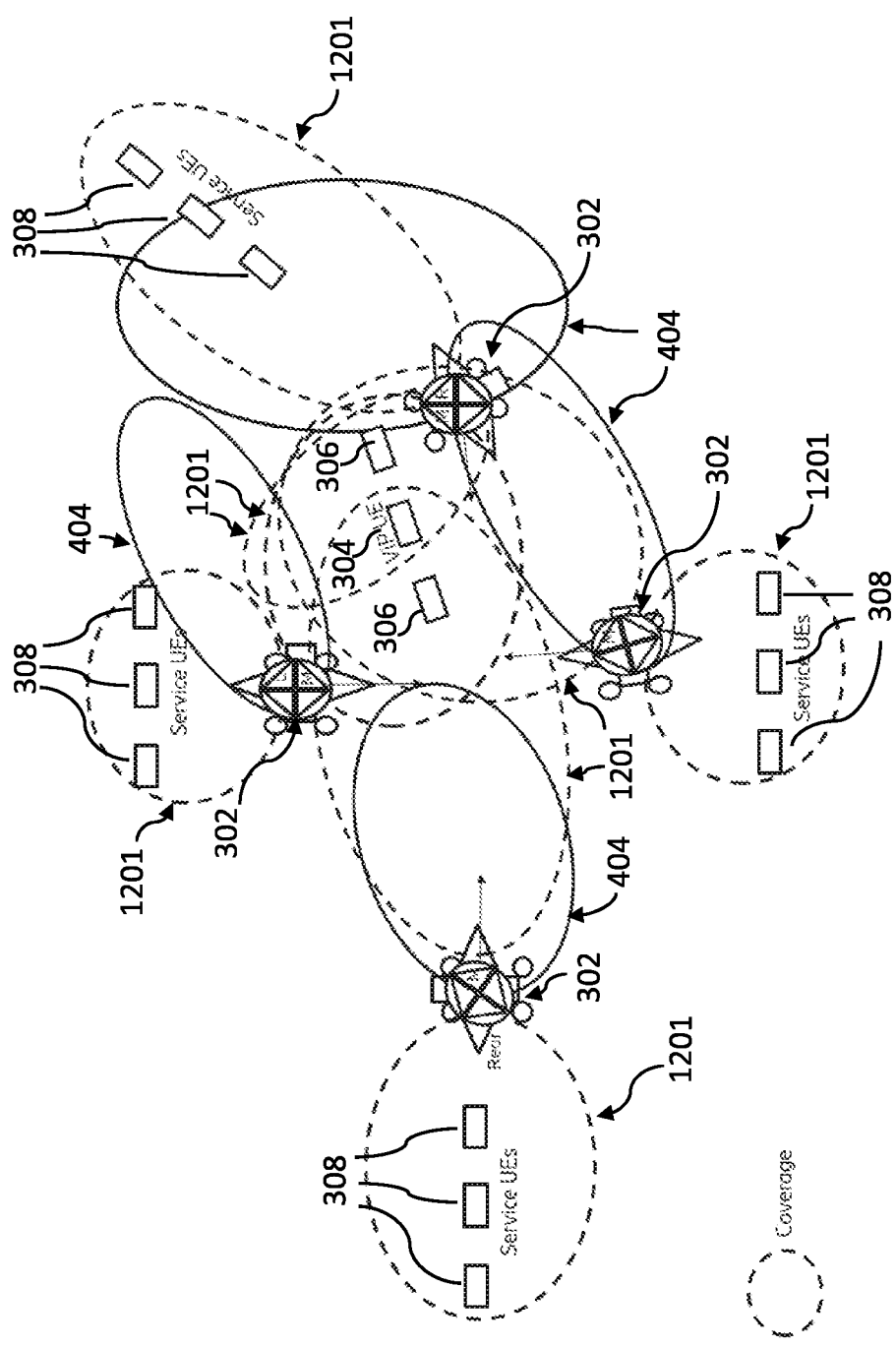
FIG. 13 schematically illustrates the attaching of aircrafts to radio devices.

In any embodiment, network separation may be done differently, e.g., using one or more levels and/or strengths of separation. Below examples of network are combinable. By way of example, FIG. 13 schematically illustrates different MRs 302 providing radio coverage 1201 to different radio devices 304 and 306 in one convoy of vehicles.

As a first example of network separation, different applications may be using the respectively best path (i.e., radio link to the best MR). As a result different application (e.g., of the same or of different radio devices) may access the RAN through different MRs 302. The path may be updated or changed for each second of working service. As a second example of network separation, a Service Profile and/or Provider Identifiers (SPIDs) may determine or control which MR 302 is associated to which of the UEs 304, 306 and 308. As a third example of network separation, the maintenance center 310 may comprise a Network Address Translation (NAT) gateway configured for switching the networks between the MR 302.

Figure 14A:
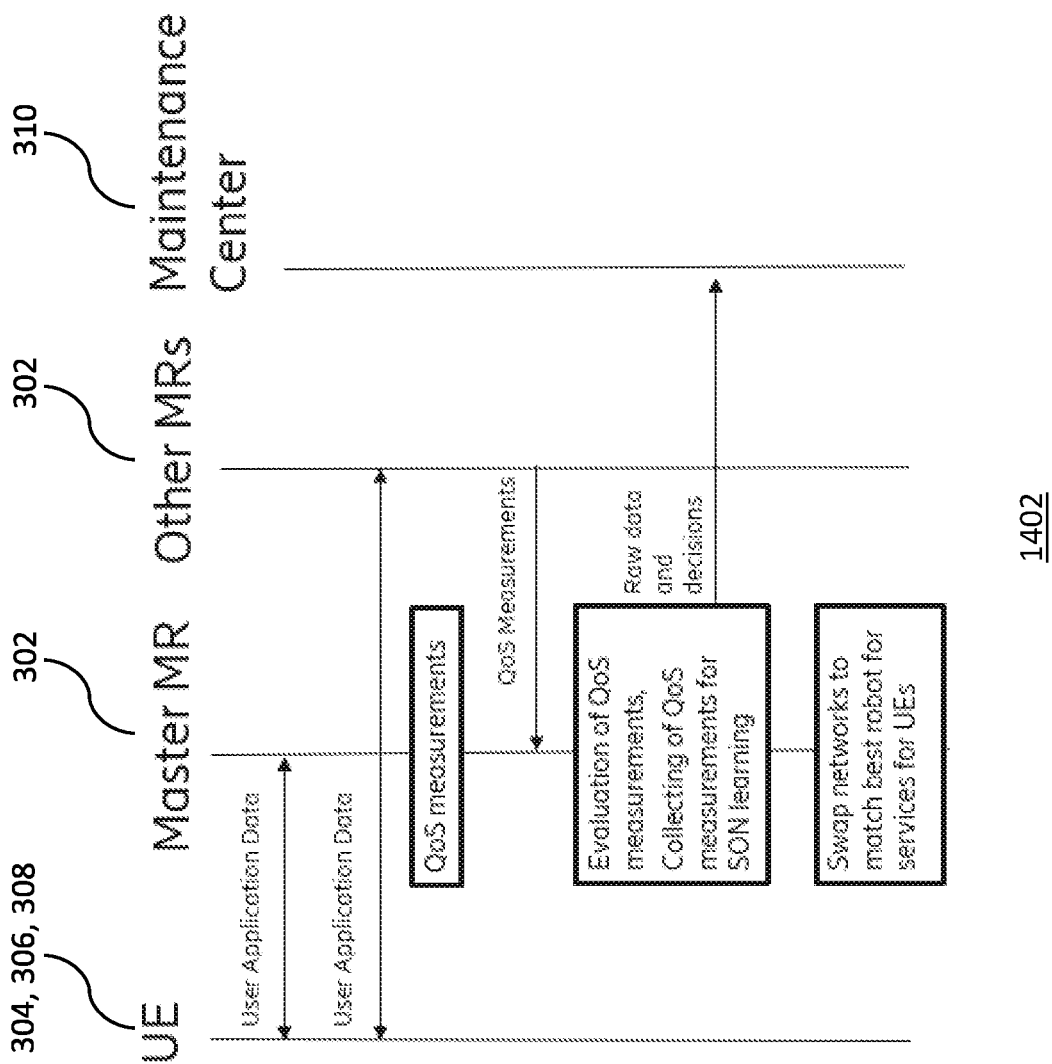
FIG. 14A shows a schematic signaling diagram for swapping of networks according to a first example.

By way of a first example, different MRs 302 may be attached to the different radio devices 304 and/or 306 and/or 308. Different networks, to which the different MRs 302 are connected, may be swapped based on QoS measurements collected at the Master MR 302 from the different MRs 302 for the respective radio devices 304 and/or 306 and/or 308. The QoS measurements and/or decisions for swapping the networks are sent to the maintenance center 310. FIG. 14A shows a schematic signaling diagram for the swapping of networks according to the first example.

Figure 14B:
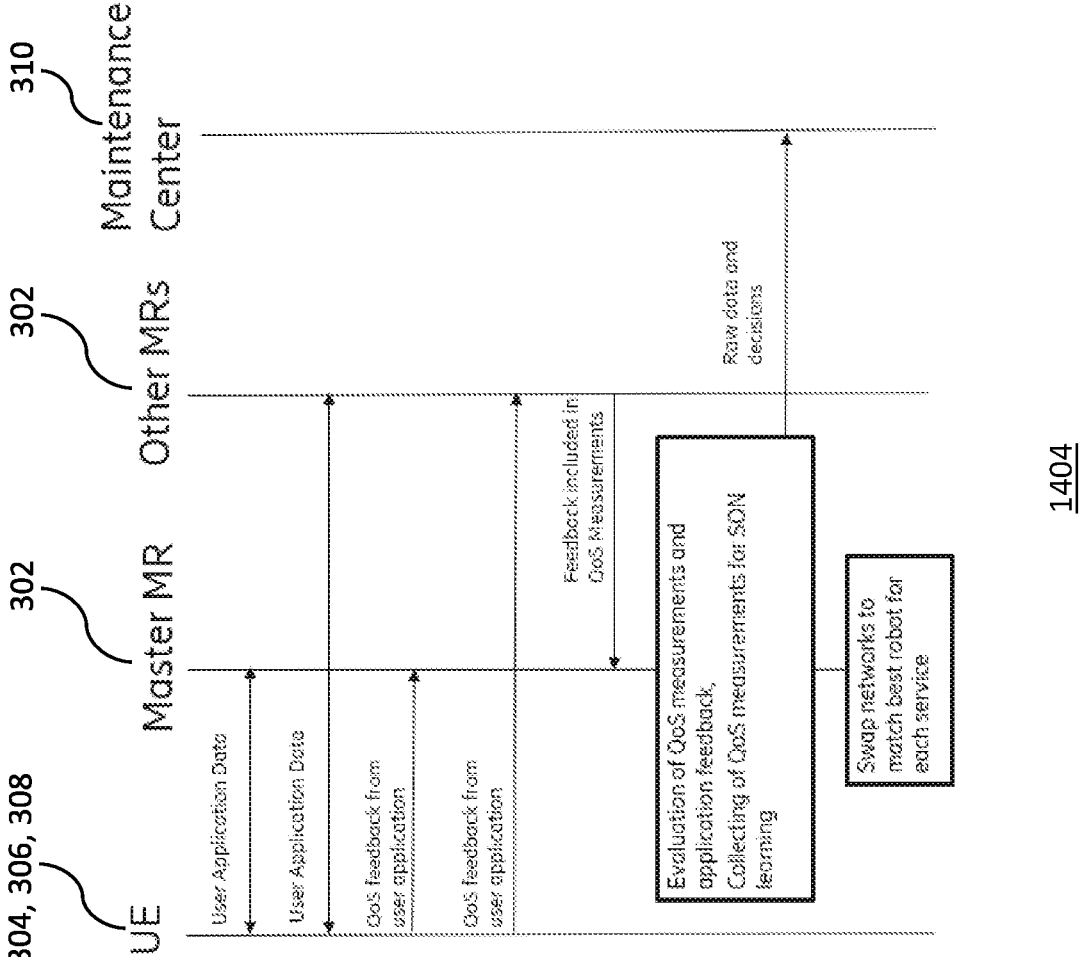
FIG. 14B shows a schematic signaling diagram for the swapping of networks according to the second example.

By way of a second example, different MRs 302 may be attached to the different radio devices 304 and/or 306 and/or 308. The networks to which the different MRs 302 are connected may be swapped based on QoS measurements and application feedback (e.g., the score) received at the Master MR 302 from the different radio devices 304 and/or 306 and/or 308 and reported to the maintenance center 310. FIG. 14B shows a schematic signaling diagram for the swapping of networks according to the second example.

Figure 14C:
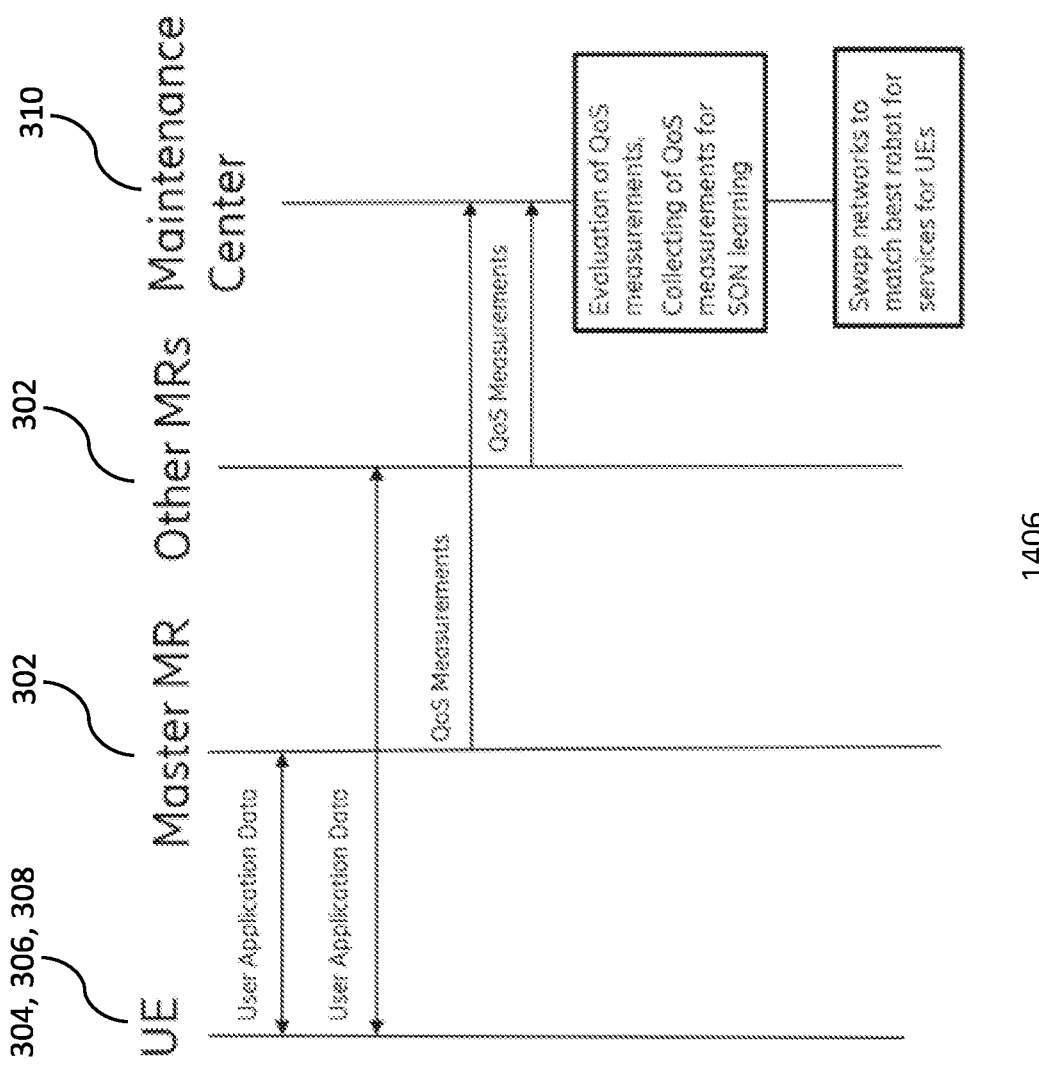
FIG. 14C shows a schematic signaling diagram for the swapping of networks according to the third example.

By way of a third example, different MRs 302 may be attached to one or more (e.g., different) radio devices 304 and/or 306 and/or 308. The one or more radio devices report their QoS measurements to the MRs 302, to which the respective radio devices are currently connected. Each of the MRs 302 forwards the QoS measurements to the maintenance center 310. Based on the QoS measurements collected at the maintenance center 310 for the one or more radio devices, the maintenance center 310 decides upon swapping the networks. FIG. 14C shows a schematic signaling diagram for the swapping of networks according to the third example.

Figure 14D:
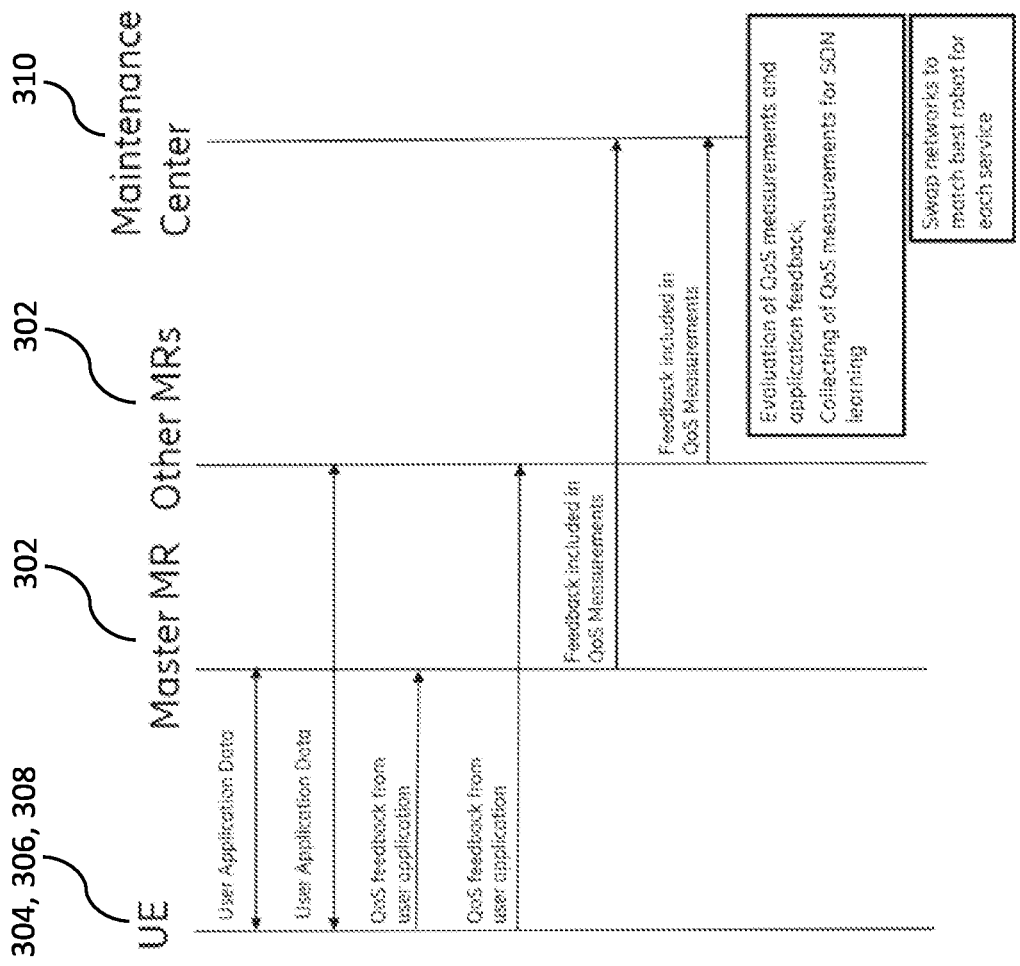
FIG. 14D shows a schematic signaling diagram for the swapping of networks according to the fourth example.

By way of a fourth example, different MRs 302 may be attached to the different radio devices 304 and/or 306 and/or 308. Each of the radio devices reports its Qos measurements and its application feedback (e.g., the score) to the MR 302, to which the respective radio device is currently connected. Each of the MRs 302 forwards the Qos measurements and the application feedback to the maintenance center 310. Based on the QoS measurements and the application feedback, the maintenance center 310 decides upon swapping the networks. FIG. 14D shows a schematic signaling diagram for the swapping of networks according to the fourth example.

As a fourth example of network separation, different MRs 302 may provide different DL sCells and/or different UL sCells of one data link using carrier aggregation (i.e. one Carrier Aggregated data link). As a fifth example of network separation, at least one of the radio devices 304, 306, and 308 (e.g., the first radio device 304) may comprise a modem for operation a dual subscriber identity module (dual SIM, e.g., multiple SIMs). The radio device 304 may be attached to one MR 302 per SIM. Alternatively or in addition, the radio device 304 may be attached to one MR 302 using a set of SIMs.

As a sixth example of network separation, at least one of the radio devices 304, 306, and 308 may comprise separate modems with multiple SIMs (e.g., a set of virtual SIMs). Each UE 304 and/or 306 and/or 308 may comprise separate SIMs, e.g., virtual SIMs or e-SIMs. For example, one MR 302 and/or 306 and/or 308 may be attached per UE 304 and/or 306 and/or 308.

Optionally, different SIMs may belong to one mobile network operator (MNO) or one telecommunications network, or to different mobile network operators (MNOs) or different telecommunications networks. For example, at least one or each of the SIMS may belong to a private telecommunications network (e.g., a network or RAN dedicated to convoys). Alternatively or in addition, at least one of the MRs 302 may provide public network coverage.

As a seventh example of network separation, switching between NAT may be performed by the telecommunications network using at least one of switching steps. A first switching step comprises roaming between networks, e.g., on interfaces S6a and S8. A second switching step may comprise releasing with redirect (e.g., with additional S10 interface in MME) in the maintenance center 310. A third switching step comprises a handover, e.g., using the interface S1. A fourth switching step comprises a data transfer load control in a Coordinated Multi Point (COMP) communication between at least two of the MRs 302 and at least one of the radio devices 304 and/or 306 and/or 308. A fifth switching step comprises multipath routing of a packet in a COMP communication or interlacing in a Carrier Aggregation (CA) communication.

Alternatively or in addition, switching between NAT may be performed without involvement of the telecommunications network. For example, measurements from the radio devices 304 and/or 306 and/or 308 within one or more convoys are reported to and processed at the maintenance center 310 or an operation center. The operation center may transmit instructions to swap and/or aggregate mobile network operators (MNOs) and/or private telecommunications networks to the SIMs (e.g., e-SIMs) belonging to multiple modems within the radio devices 304 and/or 306 and/or 308 (e.g., the first radio device 204 or ViP vehicle).

In any embodiment of the RAN, the wireless coverage 1201 (i.e., the spatial extent of radio access) may be provided by disjoint subsets of h unmanned aircrafts 302 (e.g., MRs or drones). Labelling the unmanned aircrafts 302 by numbers 1 to h, the MRs 1 to x may be connected to MNO 1 (i.e., provide radio coverage by means of or radio access to the telecommunications network of MNO 1), which is briefly referred to as MNO 1 coverage. The MRs x+1 to m may provide MNO 2 coverage, etc. The MRs m+y to g (wherein g<h) may provide MNO j coverage (wherein j>2) and the MRs g+1 to h may provide private telecommunications network coverage (i.e., theses MRs are connected to a private telecommunications network).

The convoy comprising the first radio device 304 (also referred to as target column or ViP convoy) may switch (i.e., may be swapped) from the telecommunications network of MNO a to the telecommunications network of MNO b or to the private telecommunications network on different road sections. The switching or swapping may be due to different reasons, e.g. interference or jamming (e.g., since a jammer cannot cover all frequencies), drone position, geographic obstacles, river, water areas, weather conditions etc.

Alternatively or in addition to switching the telecommunications network or the MNO, an aggregation mechanism (also referred to as multipath routing, e.g., a wireless carrier aggregation mechanism, particularly an inter-MNO multi connectivity) may be used, e.g., if the (e.g., first) radio device (e.g., a vehicle for a ViP end-user) has a multiple modems with multiple SIMs. In this case, a data stream for a specific application of the radio device may be spread or split over different MRs providing radio access to different telecommunications networks or different MNOs. For example, on a geographic section A, 35% is streamed via the telecommunications network of MNO 1, 30% via the telecommunications network of MNO 2, 25% via the telecommunications network of MNO 3 and 10% via the private telecommunications network.

Alternatively or in addition, on a geographic section B, wireless coverage conditions may change over time. For example, a bandwidth between the (e.g., first) radio device and the MR connected to the telecommunications network of MNO j and/or the private telecommunications network may vary over the time, e.g., due to different factors including positions of the MRs 302, velocities of the MRs 302, surrounding hills, obstacles, rivers, water areas, and/or weather condition. Herein, X, Y, and/or Z is equivalent to X and/or y and/or Z. For example, on the section B, 30% may be streamed via the telecommunications network of MNO 1, 25% via the telecommunications network of MNO 2, 20% via the telecommunications network of MNO 3 and 25% via the private network etc.).

The RAN (e.g., the maintenance center 310 or the operation center of the RAN) may comprise a multipath router configured to perform the wireless carrier aggregation. The multipath router may support at least one of a Transmission Control Protocol (TCP), a User Datagram Protocol (UDP), and/or a Quick UDP Internet Connections (QUIC), preferably for each MNO or for each telecommunications network.

In an embodiment of the RAN, which may be combinable with any of the aforementioned embodiments, each of the telecommunications networks of different MNOs (e.g., MNO clouds) and/or the at least one private telecommunications network comprises a swarm of aircrafts 302 (e.g., MR or drones) functioning as base stations of the RAN. The aircrafts 302 as components of the RAN can increase resilience of the radio communication between the RAN and the at least one radio device. For example, even if stationary or terrestrial base stations of the telecommunications networks of the MNOs and/or the core networks of the MNOs in the country are jammed, the private telecommunications network may still be accessible based on the surrounding drones around the one or more convoys. Due to the movement and the arrangement of the drones surrounding the one or more convoys, it is difficult for an attacker to jam the radio communication with the radio devices forming the one or more convoys.

In any of the embodiments, the operation center may be configured to monitor the at least one radio device (e.g., the VIP vehicle convoy). The controller may comprise means for artificial intelligence or machine learning.

Alternatively or in addition, the controller may be configured to predict a QoS of the radio communication between the RAN and the at least one radio device, e.g., during movement of the convoy, based on predictive connectivity from terrestrial base stations and the aircrafts functioning as base stations. The QoS may be predicted in terms of latency and/or capacity.

Alternatively or in addition, the controller may be configured to predict a behavior of the at least one radio devices, e.g., a route of driving vehicles implementing the radio devices and/or a pattern (e.g., arrangement) of the vehicles implementing the radio devices and/or an application or service used by the vehicles implementing the radio devices while driving. The prediction may be based on at least one of historical data and near-real time measurements. The measurements may relate to service key performance indicators (S-KPIs) and/or statistics of applications used, e.g., in all radio devices in all convoys.

Based on the prediction, parameters on the aircrafts 302 may be controlled, e.g. in the near-real time and to enable the best possible QoS. The prediction may relate to mobility of the at least one radio device 304, 306, 308. The mobility may comprise connectivity and/or behavior. The connectivity may comprise latency and/or capacity. The behavior may comprise a route (or path) and/or a service (or application) and/or a usage.

In a variant, the controller is, partly or completely, implemented on the aircraft 302, e.g., the master MR.

The controller of drone flight and antenna direction may comprise an ANN 800 configured to learn usual changes and/or take as input at least one of the following input quantities. A first input quantity comprises RSRP and/or RSRQ and/or uplink latency (e.g., during transmission) and/or downlink contention delay (e.g., during transmission). A second input quantity may comprise an average of one or more of the aforementioned quantities from each sCell in a Carrier Aggregation (CA), optionally weighted with a utilization of the respective sCell. A third input quantity may comprise a score of service quality given by the application that is a priority for the current network. The value of the score may be in the range of $0=<value=<1$, wherein 1 is no failures, a value in between the interval depends on the acceptable number of failures in packet delivery on time, and 0 occurs if the connection is lost or amount of failures have spoiled providing of the service by the application.

The vehicles 304, 306, 308 may transfer information to the drone 302 as a fourth input quantity. The drones 302 may store the information and/or sent the information to the maintenance center 310.

A fifth input quantity may comprise at least one of an azimuthal deviation from a vehicle; a (e.g., vertical) angle to the vehicle measured on a straight (e.g., horizontal) line connecting the drone and the vehicle; a direction (e.g., azimuth, vertical angle) of the vehicle; a velocity of the vehicle; a direction and value of drone velocity; a longitudinal acceleration (e.g., deceleration) of the vehicle; a longitudinal acceleration (e.g., deceleration) of the drone 302; a horizontal transverse acceleration (e.g., deceleration) of vehicle; a horizontal transverse acceleration (e.g., deceleration) of the drone 302; an air temperature at the vehicle and/or the drone 302; an air pressure; an air temperature at the vehicle and/or the drone 302

The signal strengths in the computation 204 may comprise any of the input quantities. Alternatively or in addition, the computation 204 may be implemented using at least one of the embodiments of the ANN 800.

At least one of the input quantities (e.g., sets of measured connection characteristics) and/or a feedback from the maintenance center 310 may be used by the aircraft 302 (e.g., the ANN 800 implemented at the aircraft 302) as the input for controlling (e.g., setting) at least one of changes in flight characteristics for the flight of the aircraft 302; the rotation 206 of the multi-sector antenna (i.e., the direction of an antenna); radio connection control; optimization of flight set of values; assignment of telecommunications network to the respective aircraft (e.g., for a wanted value of data signal).

In any embodiment, the flight of the drone 302 and the rotation 206 of the antenna may be hierarchically controlled and/or mutually balanced in the step 204 based on the radio connection control determined in the step 202. Alternatively or in addition, the radio connection control based on the determination 202 may induce a first amount of changes in flight control and a second amount of changes in antenna direction steering 206. The first amount may be less than the second amount.

The step 206 may further comprise any implementation of the swapping or switching of telecommunications networks assigned or attached to the respective aircrafts 302, e.g., a choice of the assignment of the telecommunications network of which coverage each of the drones 302 are providing.

A network operator controlling the RAN, e.g. as a self-organizing network (SON) and/or a mission critical (MC) network, can override the automatic control performed by the maintenance center 310 and/or by the aircraft 302 (e.g., the controller at the respective aircraft 302), which is choosing the most suitable aircraft 302 (e.g., the best drone) for the service or any flight characteristics or antenna direction.

Moreover, any embodiment of the aircraft 302 and/or any embodiment of the RAN may be configured to split a network service provided by the aircrafts 302 functioning as base stations of the RAN.

FIG. 13 schematically illustrates the attaching of aircrafts 302 (e.g., MRs or drones) to radio devices 304, 306, 308 (e.g., UEs) before splitting the network service provided by the aircrafts 302 between the radio devices.

The RAN provides coverage 1201 (i.e., radio access) for the first radio device 304 (e.g., the ViP UE) using the sector 402'. The RAN also provides coverage (i.e., radio access) for the other radio devices 306, which travel in the convoy (e.g., a column), in this coverage 1201. The movement of the radio devices in the convoy can be predicted in the step 204 as being in front of, behind or on the sides of the column. Hence, as the multi-sector antenna follows in the step 206 the radio signal predictions of the step 204 for the first radio device 304, the other radio devices from the same column are usually kept in this coverage 1201.

Preferably, the aircraft 302 provides the coverage 1201 all around it with antenna sectors 402. Optionally, radio signal quality and/or latency and/or score from an application are optimized for the first radio device 304 (e.g., the ViP UE) and not for service radio devices 308 (e.g., service UEs), preferably until the service provided by the aircrafts 302 is configured to split the swarm of aircrafts 302.

As schematically illustrated in FIG. 13, the coverage 1201 for the other radio devices 308 (e.g., service vehicles and/or service UEs) on the borders of the convoy comprising the first radio device, is covered by means of the other sectors 402 other than the first sector 402', when the first sector follows the first radio device according to the method 200.

Requirements of the service UEs comprise low latency connection with high reliability, e.g., Mission Critical (MC) Voice.

Moreover, any embodiment of the aircraft 302 and/or any embodiment of the RAN may be configured to confuse a potential attacker of the RAN. The swarm of aircrafts 302 (e.g., drones) can not only increase protection of the first radio device 304 (e.g., the ViP UE) with providing radio coverage 1201. The swarm of aircrafts 302 (e.g., drones) may also be configured to confuse a potential attacker of the RAN and/or the first radio device 304. In the case of an attack, the convoy (also referred to as "column") of radio devices 304 and 306 can split into several convoys with one vehicle spotted as and/or acting as ViP vehicle inside each of the split convoys. The swarm of aircrafts 302 is informed about such a need, i.e., a confusion mode, optionally with a given destination of each aircraft 302.

Figure 15:
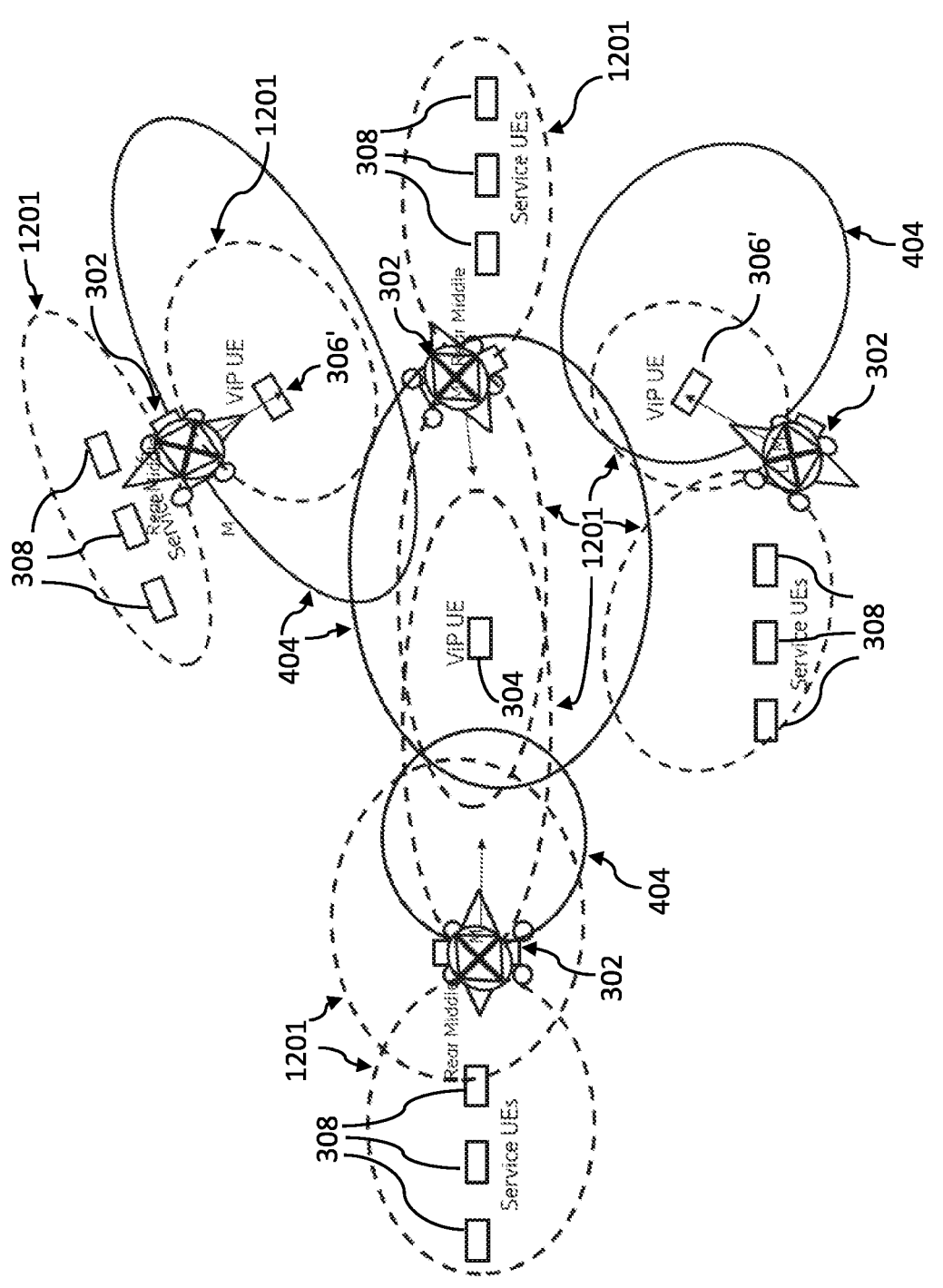
FIG. 15 schematically illustrates a RAN in a confusion mode.

In the example of the confusion mode schematically illustrated in FIG. 15, the RAN comprising aircrafts 302 (i.e., the swarm) splits into three disjoint areas of radio coverage 1201, each following a different one of three convoys by providing radio coverage 1201 with a decreased number of aircrafts 302 for each split convoy. Latency optimization may be limited to the first convoy (i.e., the convoy comprising the first radio device 304), as this does not pose a risk of being identified by an attacker.

As a result, by splitting the convoys and splitting the swarm of drones 302, the potential attacker is confused as to the location of radio links of the first radio device 304.

After sending command for such a configuration from a maintenance station or empowered security car, the security ViP cars can be assigned to car telematics and highest priority security UE to mission critical voice.

Basing on encrypted character of data signal in wireless network, it becomes still invisible to the potential attacker which vehicle uses which services. To make such an interception even more difficult, each of the aircrafts 302 transmits messages with random packets of user data to equalize the data throughput of each of the radio devices 304, 306, 308. To create the random user data training patters such "#AOAOAO" can be used with one long integer changing according to Fibonacci Sequence and encrypted with public key of the radio device 304, 306, 308 dedicated for this random user data purpose.

Radio devices 304, 306, 308 receiving such data can then be informed about random character of content of these packets by checking a digital signature. The data is then discarded.

Figures 16A, 16B, 16C:
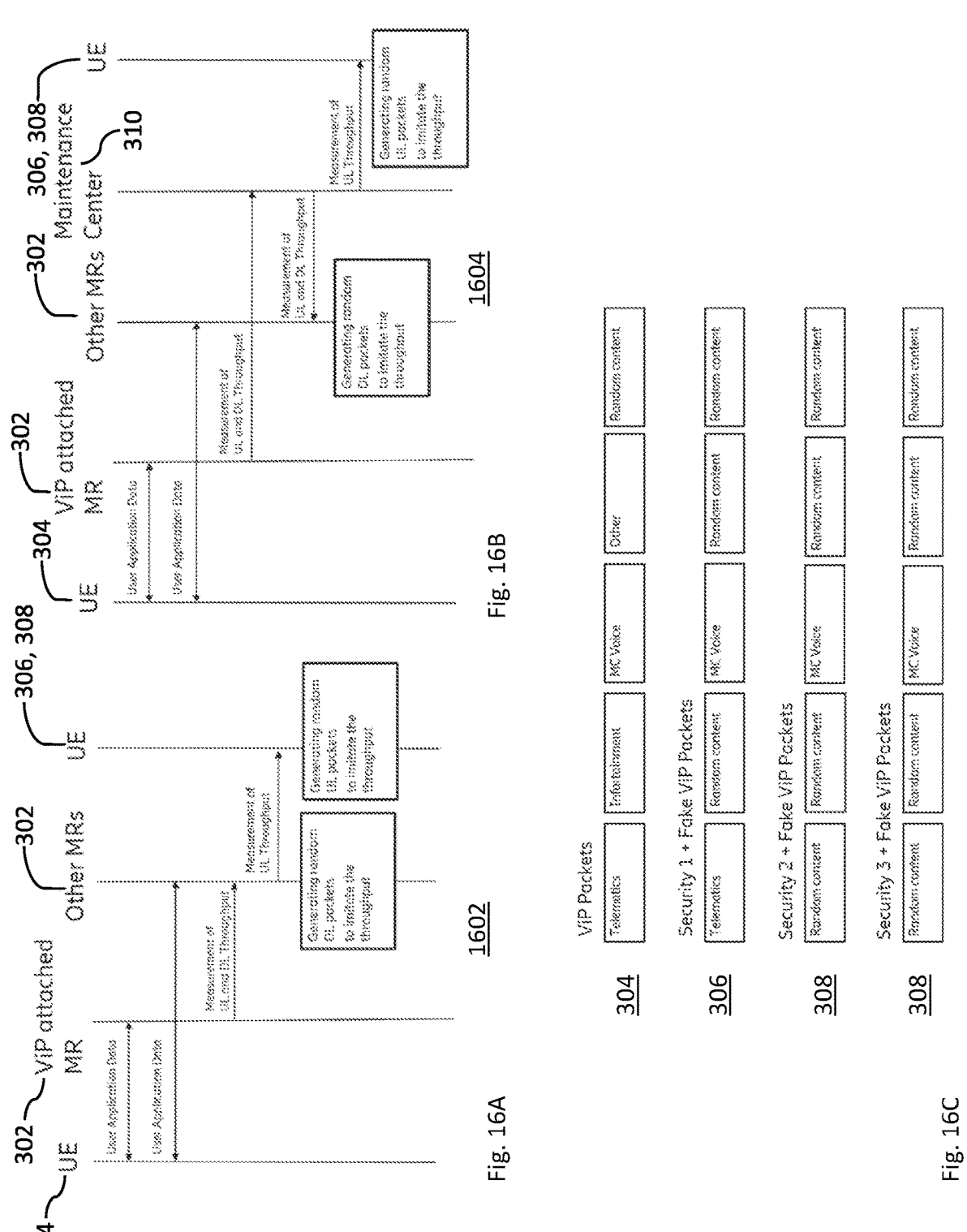
FIG. 16A schematically illustrates a signaling diagram for initiating or equalizing throughput according to a first implementation.
FIG. 16B schematically illustrates a signaling diagram for initiating or equalizing throughput according to a second implementation.
FIG. 16C shows a table indicating content for the equalizing of throughput.

FIGS. 16A and 16B schematically illustrate signaling diagrams 1602 and 1604, respectively, for initiating or equalizing throughput in the other radio devices 306 and/or 308 (e.g., security vehicles) other than the first radio device for imitating an equalized data transfer.

FIG. 16C shows a table indicating the equalizing of the downlink packets. The rows of the table correspond to the radio devices 304, 306, 308. The applications used by at least one of the radio devices are shown as columns of the table. As the swarm of aircrafts 302 splits, the content of applications in separate swarms that are not used are imitated by random content.

Each drone 302 then flies away behind the radio devices 304, 306, 308 (i.e., the vehicles) providing split coverage of the dedicated network, with the assigned set of applications. Optionally, a redundant drone 302 can be attached to any of the split RAN.

Optionally, further drones 302 may launched for service flying towards each of the separated parts of the swarm (i.e. each of the split RANs), configuring new swarms of drones 302 around the separated networks. Hence, each split RAN may be reconfigured similar to the configuration of the RAN before the splitting.

Correspondingly to the prior art document WO 2015/139733 and a daisy chain definition, each daisy chain can follow the planned and approached path of each of the split RANs (e.g., creating a separate network) and reconfiguring set of provided applications or redundancy, or no service when joining or again splitting with another daisy chain or transferring without providing the coverage, between maintenance station and serving points.

Figure 17:
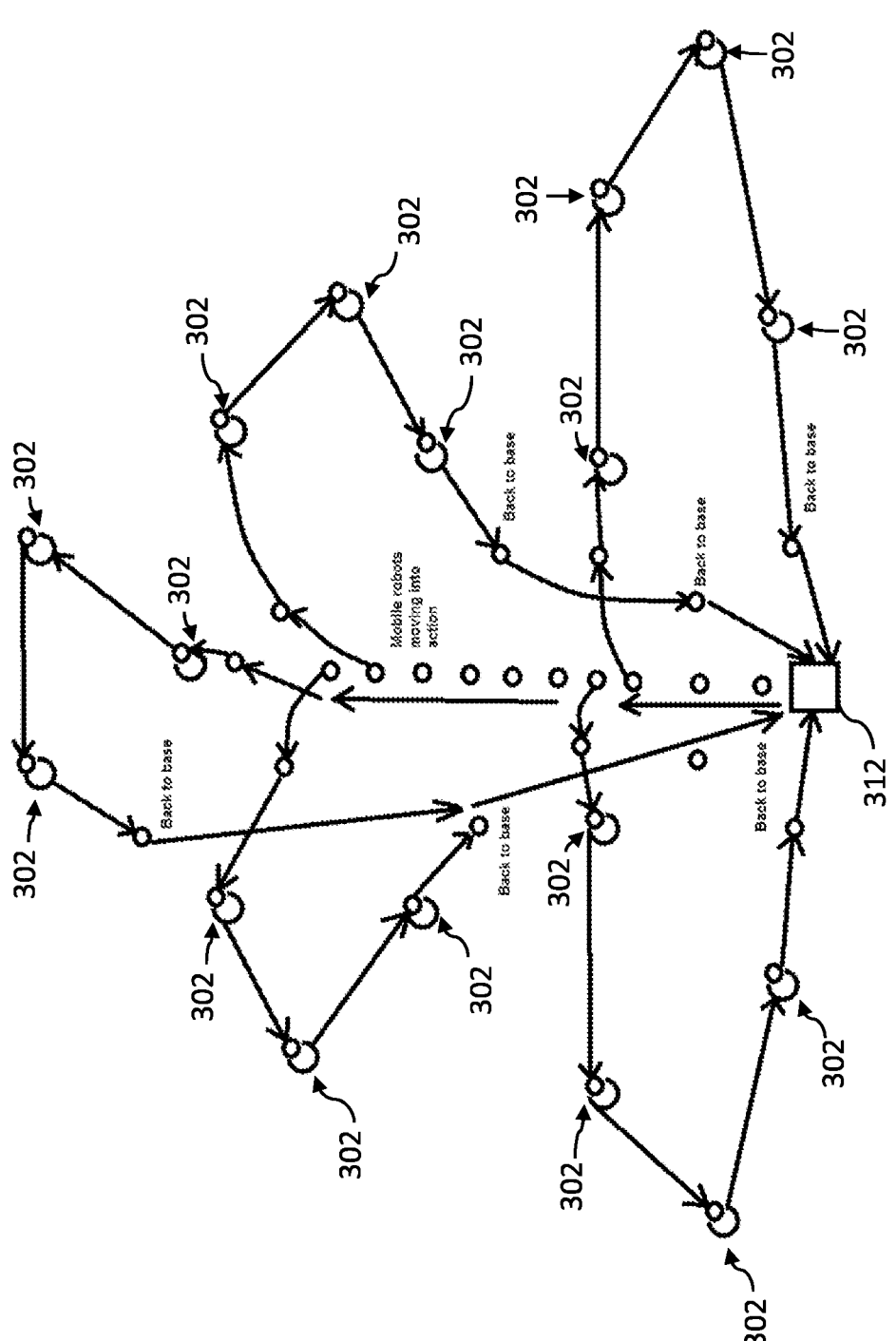
FIG. 17 schematically illustrates separate swarms in a daisy chains of aircrafts following different paths.

FIG. 17 schematically illustrates separate swarms in daisy chains of mobile robots following the different paths. Each of the closed paths starts and terminates at a base 312, e.g., implementing the maintenance center 310.

In any of the aforementioned embodiments and implementations, any one or more of the convoys may comprise terrestrial vehicles, water-surface vehicles, underwater vehicles and/or flying vehicles.

Figure 18:
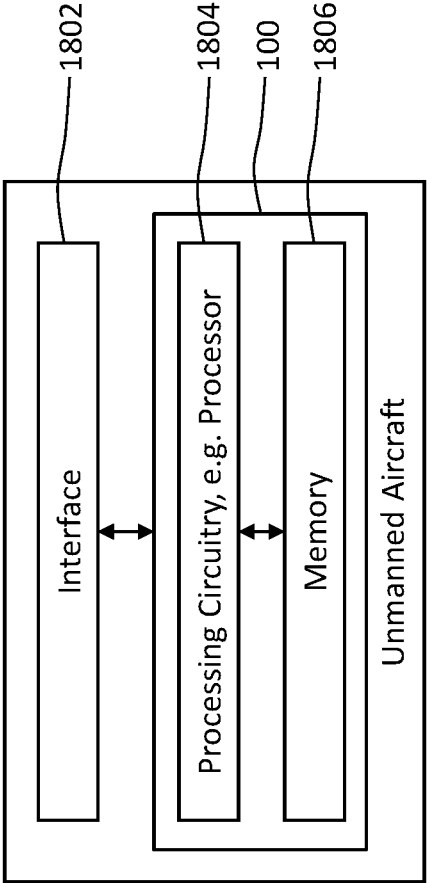
FIG. 18 shows a schematic block diagram of an aircraft embodying the device of FIG. 1.

FIG. 18 shows a schematic block diagram for an embodiment of the device 100. The device 100 comprises one or more processors 1804 for performing the method 200 and memory 706 coupled to the processors 1804. For example, the memory 1806 may be encoded with instructions that implement at least one of the modules 102, 104 and 106.

The one or more processors 1804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1806, base station functionality and/or unmanned aircraft functionality. For example, the one or more processors 1804 may execute instructions stored in the memory 1806. Such functionality may include providing various features and steps discussed herein, including any of the benefits disclosed herein. The expression "the device being operative to perform an action" may denote the device 100 being configured to perform the action.

As schematically illustrated in FIG. 18, the device 100 may be embodied by an unmanned aircraft 302, e.g., functioning as a base station or remote radio head. The aircraft 302 comprises a radio interface 1802 coupled to the device 100 for radio communication with one or more radio devices and/or one or more other base stations and/or the maintenance center 310.

Figure 19:
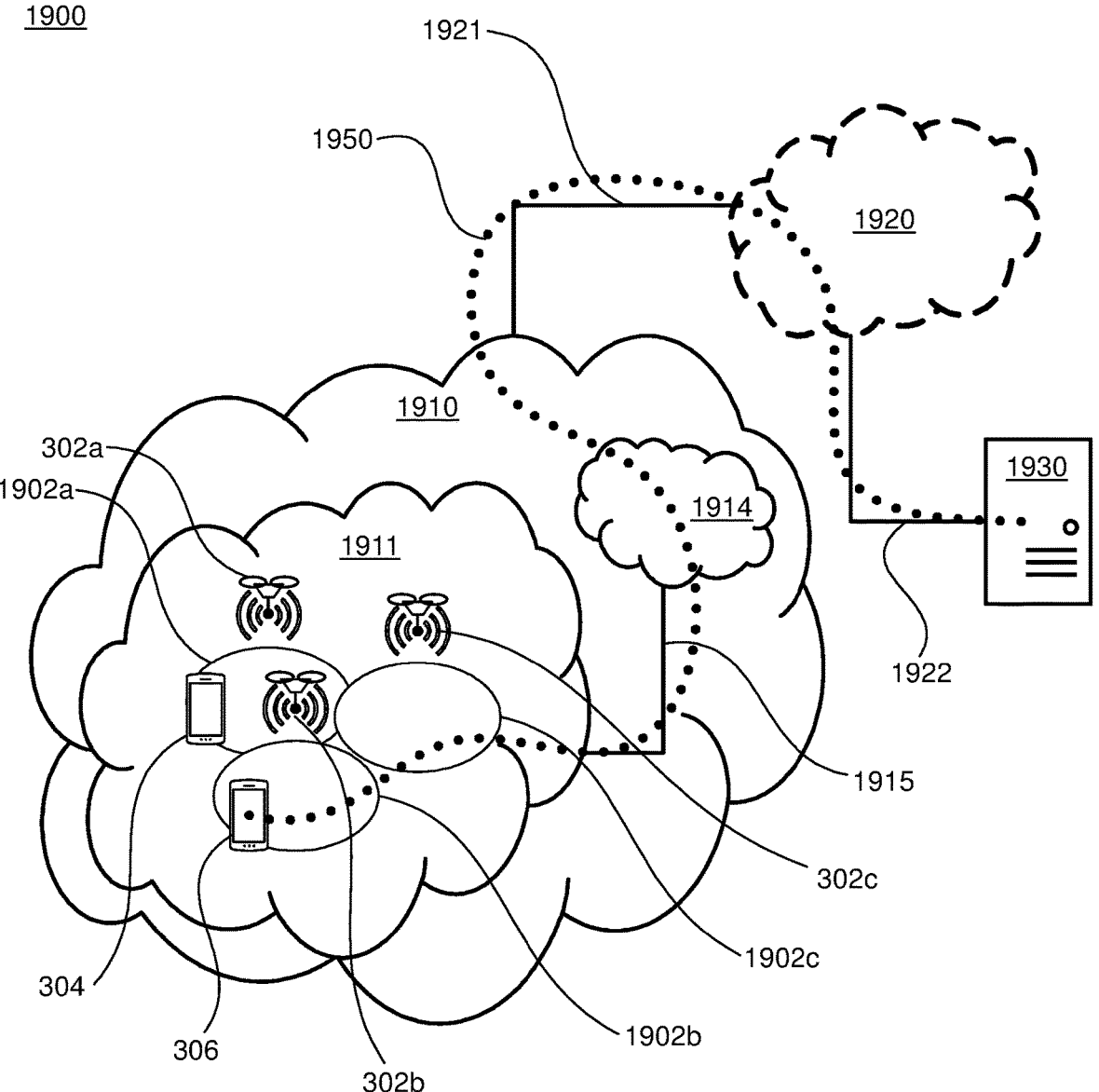
FIG. 19 schematically illustrates a telecommunication network connected via an intermediate network to a host computer.

With reference to FIG. 19, in accordance with an embodiment, a communication system 1900 includes a telecommunication network 1910, such as a 3GPP-type cellular network, which comprises an access network 1911, such as a radio access network, and a core network 1914. The access network 1911 comprises a plurality of airborne base stations 302, such as NBs, eNBs, gNBs or other types of wireless access points, each defining a corresponding coverage area 1102. Each base station 302a, 302b, 302c is connectable to the core network 1914 over a wired or wireless connection 1915. A first user equipment (UE) 304 located in coverage area 1102a is configured to wirelessly connect to, or be paged by, the corresponding base station 302a. A second UE 306 in coverage area 1102b is wirelessly connectable to the corresponding base station 302b. While a plurality of UEs 304 and 306 are illustrated in this example, the disclosed embodiments are equally applicable to a situation in which a single UE 304 is in the coverage area or in which a single UE is connecting to the corresponding base station 302.

The telecommunication network 1910 is itself connected to a host computer 1930, which may be embodied in the hardware and/or software of a standalone server, a cloud-implemented server, a distributed server or as processing resources in a server farm. The host computer 1930 may be under the ownership or control of a service provider, or may be operated by the service provider or on behalf of the service provider. The connections 1921, 1922 between the telecommunication network 1910 and the host computer 1930 may extend directly from the core network 1914 to the host computer 1930 or may go via an optional intermediate network 1920. The intermediate network 1920 may be one of, or a combination of more than one of, a public, private or hosted network; the intermediate network 1920, if any, may be a backbone network or the Internet; in particular, the intermediate network 1920 may comprise two or more sub-networks (not shown).

The communication system 1900 of FIG. 19 as a whole enables connectivity between one of the connected UEs 304, 306 and the host computer 1930. The connectivity may be described as an over-the-top (OTT) connection 1950. The host computer 1930 and the connected UEs 304, 306 are configured to communicate data and/or signaling via the OTT connection 1950, using the access network 1911, the core network 1914, any intermediate network 1920 and possible further infrastructure (not shown) as intermediaries. The OTT connection 1950 may be transparent in the sense that the participating communication devices through which the OTT connection 1950 passes are unaware of routing of uplink and downlink communications. For example, a base station 302 may not or need not be informed about the past routing of an incoming downlink communication with data originating from a host computer 1930 to be forwarded (e.g., handed over) to a connected UE 304. Similarly, the base station 302 need not be aware of the future routing of an outgoing uplink communication originating from the UE 304 towards the host computer 1930.

Example implementations, in accordance with an embodiment, of the UE, base station and host computer discussed in the preceding paragraphs will now be described with reference to FIG. 20. In a communication system 2000, a host computer 2010 comprises hardware 2015 including a communication interface 2016 configured to set up and maintain a wired or wireless connection with an interface of a different communication device of the communication system 2000. The host computer 2010 further comprises processing circuitry 2018, which may have storage and/or processing capabilities. In particular, the processing circuitry 2018 may comprise one or more programmable processors, application-specific integrated circuits, field programmable gate arrays or combinations of these (not shown) adapted to execute instructions. The host computer 2010 further comprises software 2011, which is stored in or accessible by the host computer 2010 and executable by the processing circuitry 2018. The software 2011 includes a host application 2012. The host application 2012 may be operable to provide a service to a remote user, such as a UE 2030 connecting via an OTT connection 2050 terminating at the UE 2030 and the host computer 2010. In providing the service to the remote user, the host application 2012 may provide user data which is transmitted using the OTT connection 2050.

The communication system 2000 further includes a base station 2020, e.g., any one of the aircrafts 302 comprising a device 100, provided in a telecommunication system and comprising hardware 2025 enabling it to communicate with the host computer 2010 and with the UE 2030. The hardware 2025 may include a communication interface 2026 for setting up and maintaining a wired or wireless connection with an interface of a different communication device of the communication system 2000, as well as a radio interface 2027 for setting up and maintaining at least a wireless connection 2070 with a UE 2030 located in a coverage area (not shown in FIG. 20) served by the base station 2020. The communication interface 2026 may be configured to facilitate a connection 2060 to the host computer 2010. The connection 2060 may be direct or it may pass through a core network (not shown in FIG. 20) of the telecommunication system and/or through one or more intermediate networks outside the telecommunication system. In the embodiment shown, the hardware 2025 of the base station 2020 further includes processing circuitry 2028, which may comprise one or more programmable processors, application-specific integrated circuits, field programmable gate arrays or combinations of these (not shown) adapted to execute instructions. The base station 2020 further has software 2021 stored internally or accessible via an external connection.

The communication system 2000 further includes the UE 2030 already referred to. Its hardware 2035 may include a radio interface 2037 configured to set up and maintain a wireless connection 2070 with a base station serving a coverage area in which the UE 2030 is currently located. The hardware 2035 of the UE 2030 further includes processing circuitry 2038, which may comprise one or more programmable processors, application-specific integrated circuits, field programmable gate arrays or combinations of these (not shown) adapted to execute instructions. The UE 2030 further comprises software 2031, which is stored in or accessible by the UE 2030 and executable by the processing circuitry 2038. The software 2031 includes a client application 2032. The client application 2032 may be operable to provide a service to a human or non-human user via the UE 2030, with the support of the host computer 2010. In the host computer 2010, an executing host application 2012 may communicate with the executing client application 2032 via the OTT connection 2050 terminating at the UE 2030 and the host computer 2010. In providing the service to the user, the client application 2032 may receive request data from the host application 2012 and provide user data in response to the request data. The OTT connection 2050 may transfer both the request data and the user data. The client application 2032 may interact with the user to generate the user data that it provides.

Figure 20:
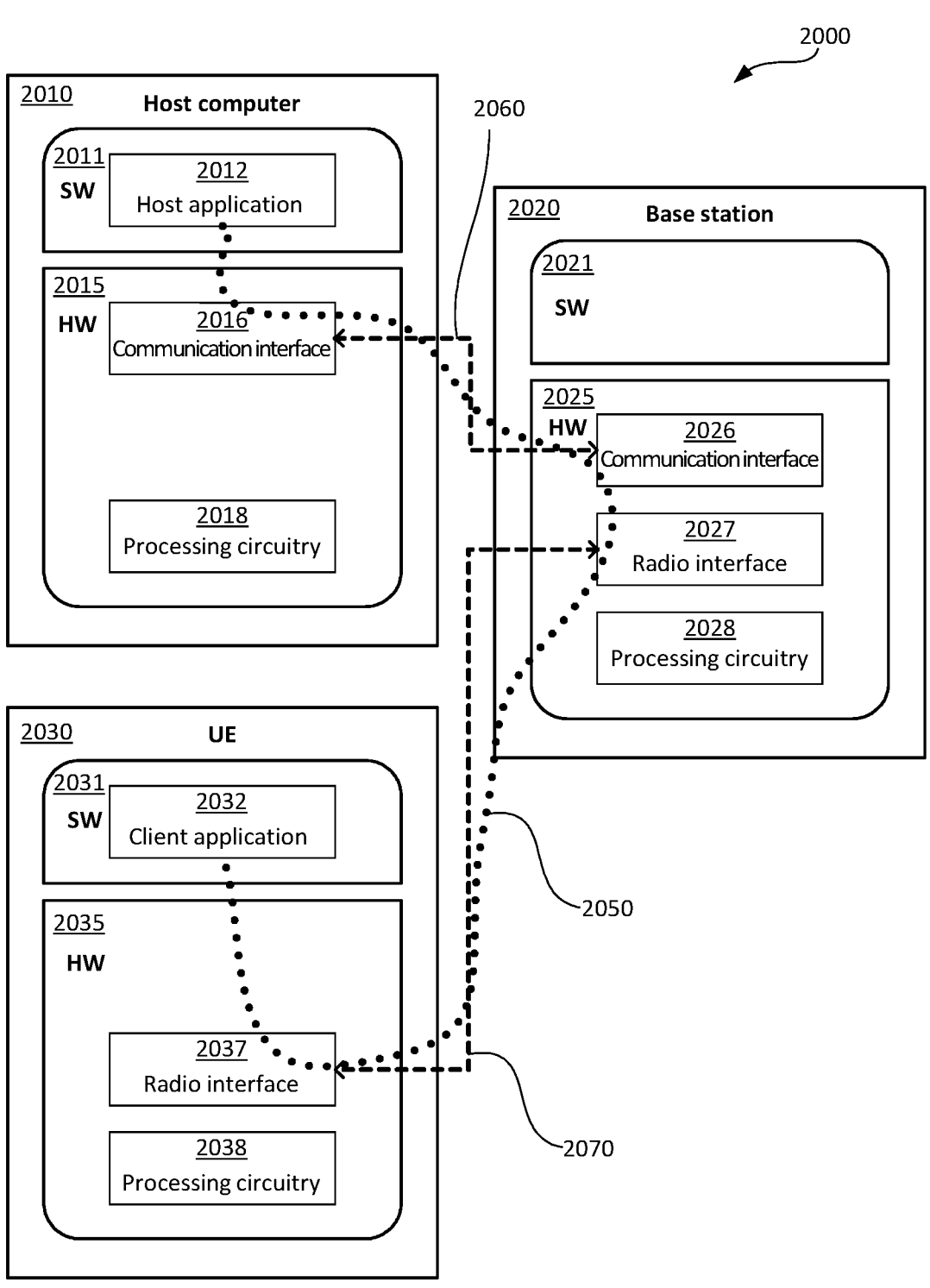
FIG. 20 shows a generalized block diagram of a host computer communicating via a base station with a user equipment over a partially wireless connection.

It is noted that the host computer 2010, base station 2020 and UE 2030 illustrated in FIG. 20 may be identical to the host computer 1930, one of the base stations 302*a*, 302*b*, 302*c* and one of the UEs 304, 306 of FIG. 19, respectively. This is to say, the inner workings of these entities may be as shown in FIG. 20 and independently, the surrounding network topology may be that of FIG. 19.

In FIG. 20, the OTT connection 2050 has been drawn abstractly to illustrate the communication between the host computer 2010 and the user equipment 2030 via the base station 2020, without explicit reference to any intermediary devices and the precise routing of messages via these devices. Network infrastructure may determine the routing, which it may be configured to hide from the UE 2030 or from the service provider operating the host computer 2010, or both. While the OTT connection 2050 is active, the network infrastructure may further take decisions by which it dynamically changes the routing (e.g., on the basis of load balancing consideration or reconfiguration of the network).

The wireless connection 2070 between the UE 2030 and the base station 2020 is in accordance with the teachings of the embodiments described throughout this disclosure. One or more of the various embodiments improve the performance of OTT services provided to the UE 2030 using the OTT connection 2050, in which the wireless connection 2070 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 2050 between the host computer 2010 and UE 2030, in response to variations in the measurement results. The measurement procedure and/or the network functionality for reconfiguring the OTT connection 2050 may be implemented in the software 2011 of the host computer 2010 or in the software 2031 of the UE 2030, or both. In embodiments, sensors (not shown) may be deployed in or in association with communication devices through which the OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of the OTT connection 2050 may include message format, retransmission settings, preferred routing etc.; the reconfiguring need not affect the base station 2020, and it may be unknown or imperceptible to the base station 2020. Such procedures and functionalities may be known and practiced in the art. In certain embodiments, measurements may involve proprietary UE signaling facilitating the host computer's 2010 measurements of throughput, propagation times, latency and the like. The measurements may be implemented in that the software 2011, 2031 causes messages to be transmitted, in particular empty or "dummy" messages, using the OTT connection 2050 while it monitors propagation times, errors etc.

Figures 21, 22:
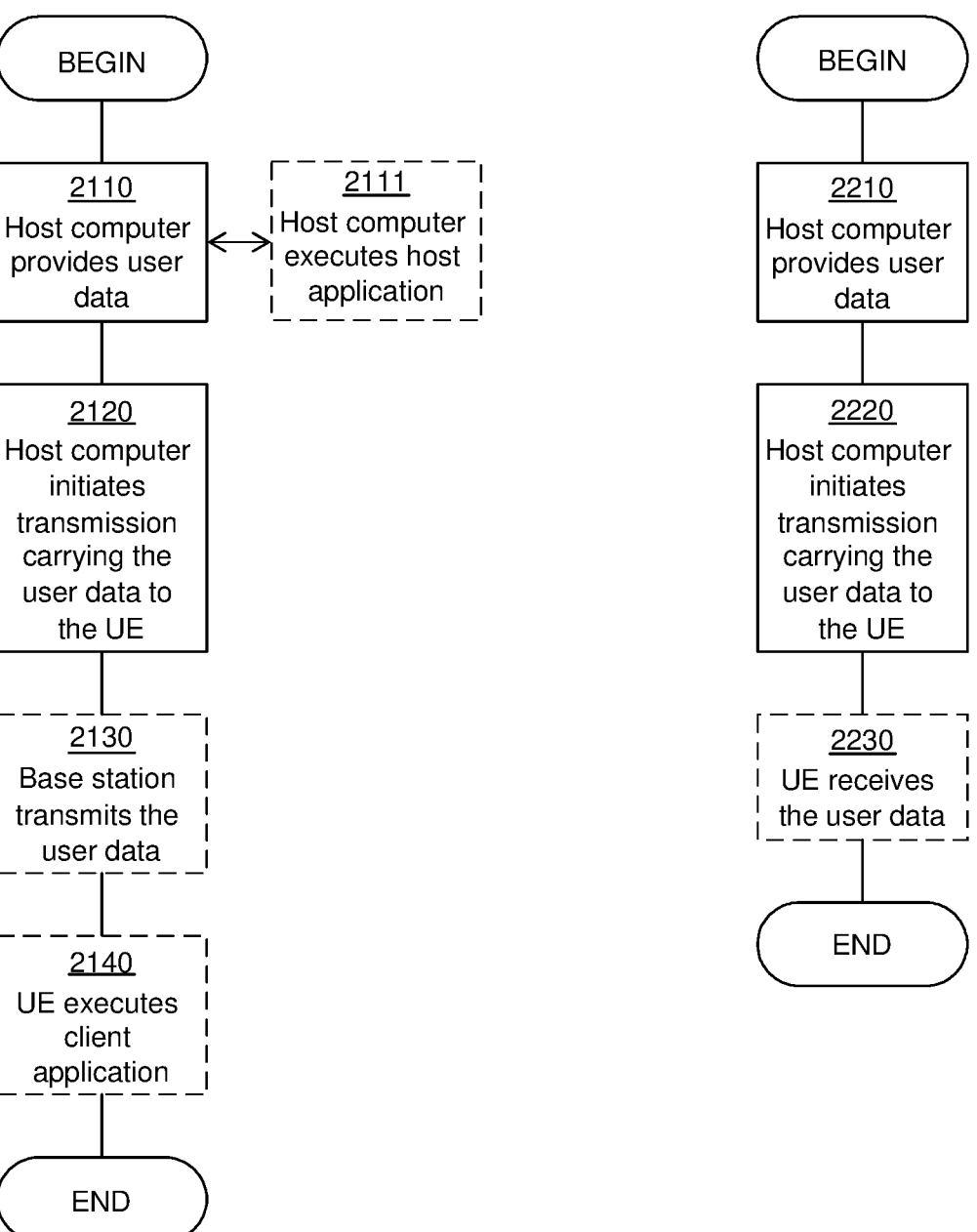
FIGS. 21 and 22 show flowcharts for methods implemented in a communication system including a host computer, a base station and a user equipment.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In a first step 2110 of the method, the host computer provides user data. In an optional substep 2111 of the first step 2110, the host computer provides the user data by executing a host application. In a second step 2120, the host computer initiates a transmission carrying the user data to the UE. In an optional third step 2130, the base station transmits to the UE the user data which was carried in the transmission that the host computer initiated, in accordance with the teachings of the embodiments described throughout this disclosure. In an optional fourth step 2140, the UE executes a client application associated with the host application executed by the host computer.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In a first step 2210 of the method, the host computer provides user data. In an optional substep (not shown) the host computer provides the user data by executing a host application. In a second step 2220, the host computer initiates a transmission carrying the user data to the UE. The transmission may pass via the base station, in accordance with the teachings of the embodiments described throughout this disclosure. In an optional third step 2230, the UE receives the user data carried in the transmission.

As has become apparent from above description, embodiments of the technique enable most of the time of wireless coverage provision that the UEs will be in the same sectors, hence avoiding at least some intra-drone and inter-drone handovers.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of operating an unmanned aircraft of a radio access network ("RAN") to rotate one or more multi-sector antennas mounted on the unmanned aircraft, each of the multi-sector antennas comprising multiple sectors, the multiple sectors of each of the multi-sector antennas being configured to provide radio access to radio devices in different azimuthal directions that are changeable relative to the aircraft and fixed relative to each other when rotating the respective one of the multi-sector antennas, the method-comprising:

determining signal strengths of radio signals exchanged between a first radio device and at least two of the multiple sectors of the multi-sector antenna mounted on the aircraft;

computing, based on the signal strengths, a first azimuthal direction for providing radio access to the first radio device;

communicating a control message with a second aircraft of the RAN that is separate from the unmanned aircraft, the control message including an indication to rotate a multi-sector antenna mounted on the second aircraft or to rotate a first sector of the multiple sectors of the multi-sector antenna mounted on the unmanned aircraft; and physically rotating the first sector of the multiple sectors of the multi-sector antenna mounted on the unmanned aircraft in the first azimuthal direction.

2. The method of claim 1, wherein computing the first azimuthal direction comprises determining the greatest signal strength among the signal strengths, and wherein the sector with which the radio signal having the greatest signal strength is exchanged determines the first azimuthal direction.

3. The method of claim 1, wherein computing the first azimuthal direction comprises interpolating the signal strengths as a function of azimuthal directions of the at least two of the multiple sectors, and wherein a maximum of the interpolated function determines the first azimuthal direction between the azimuthal directions of the at least two of the multiple sectors.

4. The method of claim 1, wherein rotating the first sector in the first azimuthal direction corresponds to an increase in the signal strength of the radio signals exchanged between the first radio device and the first sector of the multi-sector antenna.

5. The method of claim 1, wherein the signal strengths are repeatedly determined, the first azimuthal direction is repeatedly computed based on the signal strengths, and the multi-sector antenna is repeatedly rotated to provide the radio access to the first radio device while the unmanned aircraft is moving on a trajectory relative to the first radio device and/or over ground.

6. The method of claim 1, wherein the signal strengths are repeatedly determined, the first azimuthal direction is repeatedly computed based on the signal strengths, and the multi-sector antenna is repeatedly rotated to provide the radio access to the first radio device while the first radio device is moving along a path.

7. The method of claim 1, wherein the unmanned aircraft is moving on a closed trajectory relative to the first radio device and/or over ground, and wherein the first radio device is located outside of the closed trajectory and/or a distance between the first radio device and a center of the closed trajectory is greater than a diagonal of the closed trajectory.

8. The method of claim 7, wherein at least one second radio device other than the first radio device is located inside of the closed trajectory.

9. The method of claim 8, wherein at least one second sector of the multiple sectors other than the first sector provides radio access to the at least one second radio device.

10. The method of claim 1, wherein the unmanned aircraft is moving on a closed trajectory relative to the first radio device and/or over ground, and wherein the first radio device is inside the closed trajectory.

11. The method of claim 10, wherein at least one second radio device other than the first radio device is located outside of the closed trajectory.

12. The method of claim 1, wherein determining the signal strengths comprises measuring the signal strengths of the radio signals exchanged between the first radio device and each of the multiple sectors of the multi-sector antenna.

13. The method of claim 1, determining the signal strengths comprises:

rotating the multi-sector antenna for measurement; and measuring the signal strength between the first sector of the multi-sector antenna and the first radio device during the rotation for measurement.

14. The method of claim 1, wherein the multi-sector antenna comprises N sectors, wherein determining the signal strengths comprises rotating the multi-sector antenna by an angle of 360°/N, and wherein the sector exchanging the greatest signal strength with the first radio device among the N sectors is the first sector.

15. The method of claim 1, wherein determining the signal strengths comprises:

transmitting reference signals from each of the multiple sectors of the multi-sector antenna of the unmanned aircraft to the first radio device; and receiving a measurement report from the first radio device, the measurement report being indicative of the signal strengths of the reference signals measured at the first radio device.

16. The method of claim 1, wherein communicating the control message comprises transmitting the control message from the unmanned aircraft to the second aircraft, the control message being configured to initiate rotating a multi-sector antenna mounted on the second aircraft according to the control message.

17. The method of claim 16, wherein the control message is indicative of at least one of:

a position of the unmanned aircraft;

the first azimuthal direction for the multi-sector antenna mounted on the unmanned aircraft;

a position of the first radio device computed based on the position of the unmanned aircraft and the first azimuthal direction for the multi-sector antenna mounted on the unmanned aircraft;

a target position of the second aircraft computed based on the position of the unmanned aircraft and the first azimuthal direction for the multi-sector antenna mounted on the unmanned aircraft; and a target first azimuthal direction for the multi-sector antenna mounted on the second aircraft for providing radio access to the first radio device.

18. The method of claim 1, wherein communicating the control message comprises receiving the control message from the second aircraft, the control message being configured to initiate rotating the multi-sector antenna mounted on the first aircraft according to the control message.

19. The method of claim 18, wherein the second control message is indicative of at least one of:

a position of the second aircraft;

a first azimuthal direction for the multi-sector antenna mounted on the second aircraft for providing radio access to the first radio device;

a position of the first radio device;

a target position of the unmanned aircraft for providing radio access to the first radio device; and a target first azimuthal direction for the multi-sector antenna mounted on the first unmanned aircraft for providing radio access to the first radio device.

20. The method of claim 1, wherein a position of the first radio device is based on the first azimuthal direction computed for the multi-sector antenna of the respective one of the of the RAN and a distance between the first radio device and the unmanned aircraft.

* * * * *